US006277942B1

(12) United States Patent
Foss

(10) Patent No.: US 6,277,942 B1
(45) Date of Patent: Aug. 21, 2001

(54) MELT-SPUN ELASTOMERIC FIBERS AND THE PREPARATION THEREOF

(75) Inventor: Robert P. Foss, Hockessin, DE (US)

(73) Assignee: Optimer, Inc., Wilmington, DE (US)

( * ) Notice: Subject to any disclaimer, the term of this patent is extended or adjusted under 35 U.S.C. 154(b) by 0 days.

(21) Appl. No.: 09/080,965

(22) Filed: May 19, 1998

Related U.S. Application Data

(62) Division of application No. 08/931,056, filed on Sep. 16, 1997, now Pat. No. 5,840,233.

(51) Int. Cl.⁷ .................................................. C08G 18/10

(52) U.S. Cl. ........................ 528/65; 528/79; 528/906; 428/364

(58) Field of Search ............................. 528/65, 906, 79; 428/364

(56) References Cited

U.S. PATENT DOCUMENTS

| | | | |
|---|---|---|---|
| D. 289,225 | 4/1987 | Amersin .................... | D2/336 |
| D. 362,955 | 10/1995 | Imboden et al. ............ | D2/980 |
| 2,618,444 | 11/1952 | Taggart ..................... | 242/149 |
| 2,641,913 | 6/1953 | Alric ........................ | 66/132 |
| 3,071,557 | 1/1963 | Frazer et al. ............... | 524/726 |
| 3,221,522 | 12/1965 | Nebel ....................... | 66/185 |
| 3,228,198 | 1/1966 | Nebel ....................... | 66/185 |
| 3,228,214 | 1/1966 | Nebel ....................... | 66/185 |
| 3,238,746 | 3/1966 | Nebel ....................... | 66/108 |
| 3,270,526 | 9/1966 | Stack et al. ................ | 66/172 |
| 3,290,902 | 12/1966 | Warthen .................... | 66/132 |
| 3,321,069 | 5/1967 | Harmon ..................... | 206/45.31 |
| 3,342,042 | 9/1967 | Sheek et al. ............... | 66/108 |
| 3,362,029 | 1/1968 | Comerma ................... | 2/240 |
| 3,367,143 | 2/1968 | McGinty et al. ............ | 66/48 |
| 3,367,144 | 2/1968 | McGinty et al. ............ | 66/48 |
| 3,430,463 | 3/1969 | Nebel et al. ............... | 66/42 |
| 3,487,662 | 1/1970 | Safrit et al. ............... | 66/173 |
| 3,503,927 | 3/1970 | Chang et al. ............... | 260/47 |
| 3,527,181 | 9/1970 | Beamon ..................... | 112/27 |
| 3,559,654 | 2/1971 | Pope, Jr. ................... | 128/519 |
| 3,566,624 | 3/1971 | Burleson ................... | 66/177 |
| 3,580,437 | 5/1971 | Vorberg ..................... | 223/75 |
| 3,590,823 | 7/1971 | Pope, Jr. ................... | 128/519 |
| 3,595,034 | 7/1971 | Safrit ....................... | 66/177 |
| 3,646,108 | 2/1972 | Jones et al. ................ | 260/473 G |
| 3,662,760 | 5/1972 | Erteszek ................... | 128/535 |
| 3,668,185 | 6/1972 | Boutsicaris ............... | 260/75 NH |
| 3,678,514 | 7/1972 | Safrit ....................... | 2/212 |
| 3,707,825 | 1/1973 | Bell et al. .................. | 53/282 |
| 3,712,308 | 1/1973 | Herbener ................... | 128/519 |
| 3,745,793 | 7/1973 | Heinig et al. .............. | 66/146 |
| 3,761,348 | 9/1973 | Chamberlin ................ | 161/173 |
| 3,808,842 | 5/1974 | Fisher et al. ............... | 66/177 |
| 3,815,156 | 6/1974 | Gaither ..................... | 2/224 R |
| 3,874,001 | 4/1975 | Patience et al. ............ | 2/240 |
| 3,887,523 | 6/1975 | Yau et al. .................. | 260/47 C |
| 3,892,713 | 7/1975 | Burkus et al. .............. | 260/75 NC |
| 3,940,543 | 2/1976 | Chimura et al. ............ | 428/373 |
| 3,979,363 | 9/1976 | Eberius et al. ............. | 525/440 |
| 3,987,141 | 10/1976 | Martin ...................... | 264/171 |
| 4,009,495 | 3/1977 | Faust ........................ | 2/406 |
| 4,020,775 | 5/1977 | King et al. ................. | 112/121.15 |
| 4,027,667 | 6/1977 | Swallow et al. ........... | 128/165 |
| 4,072,631 | 2/1978 | Vogt et al. ................. | 252/431 R |
| 4,075,445 | 2/1978 | Kempf ...................... | 200/61.18 |
| 4,098,772 | 7/1978 | Bonk et al. ................ | 528/49 |
| 4,102,727 | 7/1978 | Bell .......................... | 156/251 |
| 4,106,313 | 8/1978 | Boe .......................... | 66/202 |
| 4,126,903 | 11/1978 | Horton ...................... | 2/409 |
| 4,136,557 | 1/1979 | Bell, Jr. et al. ............ | 73/816 |
| 4,148,960 | 4/1979 | Yung et al. ................ | 428/288 |
| 4,150,674 | 4/1979 | Yung ........................ | 428/288 |
| 4,152,113 | 5/1979 | Walker et al. ............. | 8/17 |
| 4,164,600 | 8/1979 | Yung et al. ................ | 428/198 |
| 4,168,599 | 9/1979 | King ......................... | 53/471 |
| 4,168,602 | 9/1979 | Thompson ................. | 57/243 |
| 4,172,456 | 10/1979 | Zens ......................... | 128/165 |
| 4,180,065 | 12/1979 | Bowen ...................... | 128/165 |
| 4,180,869 | 1/1980 | Pedergrass et al. ......... | 2/240 |
| 4,185,062 | 1/1980 | Luzzatto ................... | 264/211.14 |
| 4,202,855 | 5/1980 | Gerking et al. ............ | 264/210.2 |
| 4,211,819 | 7/1980 | Kunimune et al. ......... | 428/374 |
| 4,245,081 | 1/1981 | Quiring et al. ............. | 528/65 |
| 4,301,110 | 11/1981 | Cuscurida et al. .......... | 264/328.14 |
| 4,302,493 | 11/1981 | Tanaka et al. ............. | 428/91 |
| 4,304,108 | 12/1981 | Chamlee .................... | 66/138 |
| 4,341,875 | 7/1982 | Visger et al. ............... | 521/164 |
| 4,353,227 | 10/1982 | Shields et al. ............. | 66/146 |
| 4,376,834 | 3/1983 | Goldwasser et al. ....... | 521/159 |
| 4,382,128 | 5/1983 | Li ............................ | 524/513 |

(List continued on next page.)

FOREIGN PATENT DOCUMENTS

| | | |
|---|---|---|
| 744429 | 10/1966 | (CA) . |
| 24 56 824 A1 | 6/1975 | (DE) . |
| 24 41 538 A1 | 3/1976 | (DE) . |
| 29 14 545 A1 | 10/1980 | (DE) . |
| 0 316 150 A2 | 5/1989 | (EP) . |

(List continued on next page.)

OTHER PUBLICATIONS

Encyclopedia of Polymer Science & Engineering; 1986; pp. 733–737, 739–742, 744, 747, 748.*

Makarski, S. et al., "Effect of some low–molecular–weight chain extenders and corsslinkers on the properties of cast urethane elastomers", *Polimery*, 1987, 32(11–12), 475–477 (English abstract included).

(List continued on next page.)

*Primary Examiner*—Rachel Gorr
(74) *Attorney, Agent, or Firm*—Woodcock Washburn Kurtz Mackiewicz & Norris LLP

(57) ABSTRACT

Novel melt-spun elastomeric fibers and methods for their preparation. Embodiments are provided in which fibers are melt-spun from a melt-spinnable elastomeric polymer comprising a diisocyanate-capped polyol prepolymer which is chain-extended with an aromatic dihydroxy compound. Also provided are melt-spinnable elastomeric polymers and prepolymers therefor. The fibers may be knit or woven into textile articles including, inter alia, hosiery and pantyhose.

36 Claims, 9 Drawing Sheets

U.S. PATENT DOCUMENTS

| | | | |
|---|---|---|---|
| 4,386,127 | 5/1983 | Tanaka et al. | 428/91 |
| 4,424,258 | 1/1984 | Bach | 428/370 |
| 4,442,281 | 4/1984 | Hentschel et al. | 528/79 |
| 4,454,196 | 6/1984 | Iohara et al. | 428/359 |
| 4,467,595 | 8/1984 | Kramers | 57/225 |
| 4,485,719 | 12/1984 | Mendelsohn et al. | 89/1.816 |
| 4,532,316 | 7/1985 | Henn | 528/59 |
| 4,542,165 | 9/1985 | Kumata et al. | 521/137 |
| 4,552,603 | 11/1985 | Harris, Jr. et al. | 156/167 |
| 4,554,121 | 11/1985 | Kramers | 264/103 |
| 4,554,684 | 11/1985 | Cadoret | 2/227 |
| 4,558,653 | 12/1985 | Horton et al. | 112/262.2 |
| 4,597,927 | 7/1986 | Zeitler et al. | 264/85 |
| 4,598,817 | 7/1986 | Bell, Jr. et al. | 198/468.2 |
| 4,602,710 | 7/1986 | Bell, Jr. et al. | 198/468.2 |
| 4,640,162 | 2/1987 | London et al. | 83/152 |
| 4,673,139 | 6/1987 | Memminger et al. | 242/47.01 |
| 4,687,151 | 8/1987 | Memminger et al. | 242/54 R |
| 4,687,831 | 8/1987 | Ogata et al. | 528/64 |
| 4,702,871 | 10/1987 | Hasegawa et al. | 264/101 |
| 4,704,976 | 11/1987 | London et al. | 112/262.2 |
| 4,731,217 | 3/1988 | Gerhartz et al. | 264/555 |
| 4,731,435 | 3/1988 | Greene et al. | 528/289 |
| 4,739,013 | 4/1988 | Pinchuk | 525/101 |
| 4,769,435 | 9/1988 | Lunardon et al. | 528/28 |
| 4,791,187 | 12/1988 | Süling et al. | 528/60 |
| 4,798,880 | 1/1989 | Lodoen | 528/63 |
| 4,809,482 | 3/1989 | Horton et al. | 53/131 |
| 4,810,770 | 3/1989 | Greene et al. | 528/289 |
| 4,838,162 | 6/1989 | Horton et al. | 101/296 |
| 4,840,847 | 6/1989 | Ohmae et al. | 428/373 |
| 4,852,188 | 8/1989 | Marsh et al. | 2/250 |
| 4,865,463 | 9/1989 | Howard | 383/33 |
| 4,872,324 | 10/1989 | Rearwin et al. | 66/172 E |
| 4,902,461 | 2/1990 | Schippers | 264/103 |
| 4,906,729 | 3/1990 | Greene et al. | 528/272 |
| 4,937,314 | 6/1990 | Greene | 528/272 |
| 4,940,559 | 7/1990 | Kretschmann et al. | 264/130 |
| 4,973,236 | 11/1990 | Hasegawa et al. | 435/72.2 |
| 5,009,951 | 4/1991 | Ohmae et al. | 428/294 |
| 5,014,364 | 5/1991 | Orr | 2/408 |
| 5,021,534 | 6/1991 | Kawasaki et al. | 528/60 |
| 5,023,957 | 6/1991 | Harvey | 2/409 |
| 5,040,475 | 8/1991 | Fournier et al. | 112/121.15 |
| 5,061,777 | 10/1991 | Yoda et al. | 528/61 |
| 5,069,819 | 12/1991 | Sturm et al. | 252/402 |
| 5,076,773 | 12/1991 | Bert | 425/66 |
| 5,086,518 | 2/1992 | Staley | 2/239 |
| 5,094,110 | 3/1992 | Porter et al. | 73/832 |
| 5,096,993 | 3/1992 | Smith et al. | 528/61 |
| 5,136,010 | 8/1992 | Reisch et al. | 528/75 |
| 5,136,727 | 8/1992 | Brisco | 2/409 |
| 5,162,455 | 11/1992 | Greene | 525/437 |
| 5,164,262 | 11/1992 | Kobayashi et al. | 428/373 |
| 5,165,355 | 11/1992 | Fournier et al. | 112/262.2 |
| 5,167,899 | 12/1992 | Jezic | 264/510 |
| 5,171,633 | 12/1992 | Muramoto et al. | 428/374 |
| 5,185,420 | 2/1993 | Smith et al. | 528/61 |
| 5,219,633 | 6/1993 | Sabee | 428/109 |
| 5,226,194 | 7/1993 | Staley | 2/239 |
| 5,235,860 | 8/1993 | Horton et al. | 73/832 |
| 5,255,393 | 10/1993 | Brady | 2/409 |
| 5,277,862 | 1/1994 | Steppan et al. | 264/257 |
| 5,280,652 | 1/1994 | Davis et al. | 2/409 |
| 5,310,852 | 5/1994 | Hirai et al. | 528/83 |
| 5,340,902 | 8/1994 | Smith et al. | 528/61 |
| 5,352,518 | 10/1994 | Muramoto et al. | 428/373 |
| 5,362,433 | 11/1994 | Toscan et al. | 264/210.8 |
| 5,391,682 | 2/1995 | Ogawa et al. | 528/59 |
| 5,393,858 | 2/1995 | Meijs et al. | 528/61 |
| 5,411,693 | 5/1995 | Wust, Jr. | 264/172.15 |
| 5,418,310 | 5/1995 | Kangas | 528/59 |
| 5,430,122 | 7/1995 | Drysdale | 528/55 |
| 5,465,594 | 11/1995 | Imboden et al. | 66/177 |
| 5,466,410 | 11/1995 | Hills | 264/172.11 |

FOREIGN PATENT DOCUMENTS

| | | |
|---|---|---|
| 0 417 553 A2 | 3/1991 | (EP) . |
| 1474248 | 3/1967 | (FR) . |
| 1575019 | 7/1969 | (FR) . |
| 2104087 B | 12/1984 | (GB) . |
| 45-32955 | 10/1970 | (JP) . |
| 47-7461 | 4/1972 | (JP) . |
| 47-31715 | 11/1972 | (JP) . |
| 57-193521 | 11/1982 | (JP) . |
| 61-34220 | 2/1986 | (JP) . |
| 61-41323 | 2/1986 | (JP) . |
| 61-289123 | 12/1986 | (JP) . |
| 61-289124 | 12/1986 | (JP) . |
| 62-170509 | 7/1987 | (JP) . |
| 62-275119 | 11/1987 | (JP) . |
| 2-160919 A | 6/1989 | (JP) . |
| 2-118145 | 5/1990 | (JP) . |
| 2-160920 A | 6/1990 | (JP) . |
| 3-287816 | 12/1991 | (JP) . |
| WO 92/00408 | 1/1992 | (WO) . |
| WO 95/23883 | 9/1995 | (WO) . |
| WO 98/56845 | 12/1998 | (WO) . |

OTHER PUBLICATIONS

Masiulanis, B., "Thermoplastic Polyurethane Elastomers—Thermostability in Relation to Composition", *J. Appl. Polym. Sci.,* 1984, 29(2), 681–690.

Minoura, Y. et al., "Crosslinking and mechanical property of liquid rubber. III. Curative effect of aralkyl and alicyclic diols", *J. Appl. Polym. Sci.,* 1979, 23(4), 1137–1151.

Rebsamen, A. et al., "Heberlein: the HFP composite yarn process", *Textile World,* 1992, 142(4), 54–56.

Rebasamen, A. et al., "Progress in the Manufacture of Quality Elasticated Yarns by Means of the HFP Process," *Chemifasern/Textil–industrie,* 1991, 41/93 (8), 859–860, 862–863, E102–E104.

Teodorescu–Borza, O. et al., "Methodology of Testing and Evaluating Hosiery Quality—Specific Methods for Apparatus and Evaluating Tolerance Levels for the Established Characteristics", *Industria Usoara: Textile, Tricotaje, Confectii Textile,* 1989, 40(5), 224–226 (English abstract included).

Tomasini, E., "Menegatto equipment at ITMA 91. The covering machine 2000", *Nuova Selezione Tessile,* 1991, 9/10, 48–50 (English abstract included).

Tsyganeko, N.I. et al., "Causes for the Decrease of Stretchability of Stockings Made from Elastomer", *Tekstilnaia Promyshlennost'* (Moscow), Jul. 1984, 7, 98–101 (English abstract included).

Wong, S.W. et al., "Reactivity studies and cast elastomers based on trans–cyclohexane–1, 4–diisocyanate and 1,4–phenylene diisocyanates", *ACS Symp. Ser.,* 1981, 172, 419–431.

Woo, E.J. et al., "Structure–property relationships in thermoplastic elastomers. I. Segmented polyether–polyurethanes", *(Gov. Rep. Announce. Index,* 1985, 85(4), Office of Naval Research, Technical Report No. 4, Oct. 26, 1984, 1–26 and 8 sheets of figures.

"Polyurethane plastics and method of preparation", *Res. Discl.,* 1976, 14563, 60.

America's Textiles International, "Company of the Year", Macfield Incorporated, Madison, North Carolina, Jan. 1991, 21(1), 36–38, 40, 42, 44, 46.

"Globe Manufacturing: an elastomeric performance leader", *Nonwovens Industry,* 1993, 25(5), 71.

*Textile Organon,* Aug., 1998, 184.

*Textile Organon,* Aug. 1987, 196.

*Textile Organon,* Aug. 1986, 192.

*Textile Organon,* Jul. 1983, 124.

*Textile Organon,* May 1982, 98–99.

*Textile Organon,* Mar. 1982, 60–61.

*Textile Organon,* Mar. 1982, 47–50.

*Textile Organon,* Jul. 1980, 116–117.

"United States Production of Hosiery", *Fiber Organon,* 1992, 63(8), 169.

Harrell, Jr., "Segmented Polyurethans. Properties as a Function of Segment Size and Distribution", *Seg. Polyurethans,* 1969, 2(6), 607–612.

Bauer, K.H. et al., "Production of New Yarn Types on False–Twist and Air–Texturing Machines", *Chemiefasern/Textil–industrie,* (Manmade Fiber Yearbook), 1991, 84–87.

Bauer, H.J., "Developments in Single Cylinder Sock Technology", *Knitting Tech.,* 1995, 17(4), 210–216.

Bauer, K.H., "The Production of New Yarn Types on False–Twist and Air–Texturing Machines", *Chemiefasern/Textil–industrie,* 1990, 40(92), 981–985, E105–E107.

Burns, D. et al., "Rapid identification of solid polurthane elastomers", *J. Chromatogr.,* 1975, 105(1), 43–48.

Douglas, T. et al., "Guide to processing liquid cast elastomers", *Rubber World,* 1981, 184(1), 30, 32.

Fourne, F., "Elastane yarns: production properties, application", *Chemiefasern/Textilindustrie,* 1994, 44/96 (7/8) E45–48.

Jacques, M.L., "Micro into Hosiery", *Textile Asia,* 1992, 23(11), 50–53.

Klempner, D. et al., "A new aromatic diol chain extender for urethane elastomers", *Adv. Urethane Sci. Technol.,* 1981, 8, 93–103.

Lin, I.S. et al., "Comparison of diol cross–linkers in castable urethane elastomers", *Am. Chem. Soc. Symp. Ser.,* 1981, 172, 523–531.

Lin, I.S. et al., "Comparison of diol and diamine crosslinkers in castable urethane elastomers", *Adv. Urethane Sci.,* 1981, 8, 105–117.

* cited by examiner

■ MELT INDEX(MI)

f(x)=3.015965+15° (X^-2.841157E+0)
R^2=9.179835E-1 f(x)=2.487502E-2*x+-1.765303E+3
R^2=8.654634E-1 f(x)=-1.075270E+0 x +2.262132E+1
R^2=9.963039E-1

MELT-SPUN ELASTOMERIC FIBERS AND THE PREPARATION THEREOF

CROSS-REFERENCE TO RELATED APPLICATIONS

This is a divisional of U.S. application Ser. No. 08/931,056, filed Sep. 16, 1997, now U.S. Pat. No. 5,840,233.

FIELD OF THE INVENTION

The present invention relates to novel melt-spun elastomeric fibers and the preparation thereof. More particularly, the present invention relates to novel melt-spun elastomeric fibers which may be useful in the preparation of textile articles and which may be prepared from melt-spinnable elastomeric polymers.

BACKGROUND OF THE INVENTION

Elastomeric polymers, particularly polyurethane elastomers, are becoming increasingly important in commercial applications. Unlike many other thermoplastic and thermoset elastomers, a wide variety of raw materials may be employed in the preparation of polyurethane elastomers, thereby allowing the preparation of elastomers with physical properties geared to the intended application. Thus, there are a myriad of diverse applications for polyurethane elastomers including, for example, caulks and sealants, elastomeric fibers, viscoelastic and energy absorbing materials, and extrusion and injection moldable articles such as gears, automobile fascias, and ski boots.

Spandex is a particular elastomeric polymer in fiber form which is a well-known component of clothing, particularly sportswear, which adds stretch to the clothing. Spandex is a urethane-containing polymer composed of alternating soft and hard regions within the polymer structure. Generally speaking, there are three methods for manufacturing fibers, including Spandex fibers, from polyurethane polymers: (1) dry-spinning; (2) wet-spinning, and (3) melt-spinning. Both dry-spinning and wet-spinning involve the use of organic solvents which, due to health, safety and environmental considerations, is preferably avoided. Melt-spinning is thus advantageous inasmuch as it does not involve the use of solvents.

Prior art polyurethanes are often prepared by the "one-shot" method. This method involves reacting together, at the same or about the same time, the various reaction components including, for example, polyol, diisocyanate compound and chain extender. The one-shot method often leads to polyurethanes, particularly polyurethanes in which the chain extender includes aromatic moieties, which typically contain higher melting material, i.e., material having melting points of, for example, about 225° C. or greater, including above about 235° C. The use of melt-spinning temperatures of greater than about 225° C. may therefore be required during melt-spinning of prior art polyurethanes. However, the polyurethanes themselves are generally thermally unstable at temperatures above about 225° C. Thus, the use of higher temperatures during melt-spinning may result in thermal decomposition of the polyurethane, whereas the use of lower melt-spinning temperatures may result in plugging or clogging by the higher melting material of the melt-spinning apparatus. Accordingly, polyurethanes generally cannot be melt-spun with the continuity required for commercial operations if they contain any higher melting material. As a consequence, polyurethanes generally must be dissolved in a solvent and either dry or wet spun into fibers which, as noted above, poses safety and environmental concerns.

In attempting to address the aforementioned problems with prior art polyurethanes, polyurethanes have also been prepared in which the involved chain extender is a compound which contains no aromatic moieties, i.e., an aliphatic compound. However, these polyurethanes are generally characterized by undesirable chemical and/or physical properties, including tackiness, low melting temperatures and low heat distortion temperatures. Products melt-spun from these polyurethanes are readily prone to melting or to becoming misshapen upon exposure to slightly elevated temperatures. To improve their heat resistance, prior art melt-spun polyurethanes have been crosslinked during and/or after the spinning process. Crosslinking in melt-spinning processes is generally undesirable in that it adds complexity and cost to the spinning methods. Unexamined Japanese application No. SHO 63(1988)-317238 describes an alternate crosslinking process in which unreacted ingredients are injected into the spin cell to complete the crosslinking reaction. This process is also undesirable in that it leaves the yarn only partially cured as it is wound during spinning and it must be permitted to cure before rewinding and/or shipping.

Accordingly, new and/or better alternatives to prior art methods and elastomeric polymers for use in the manufacture of melt-spun fibers are needed. The present invention is directed to these as well as other important ends.

SUMMARY OF THE INVENTION

The present invention is directed generally to melt-spun fibers which may be useful in the preparation of textile articles. Specifically, in one embodiment, there is provided a melt-spun fiber which is prepared from a melt-spinnable elastomeric polymer having the formula:

$$[Pr-Ar]_n \qquad (I)$$

wherein:

n is from about 30 to about 65;

Ar is a residue of an aromatic dihydroxy compound; and

Pr is a prepolymer which comprises:

from about 85 to about 95 mole % of a prepolymer component of formula T-G-T;

from about 3 to about 15 mole % of a prepolymer component of formula T-G-T-G-T; and from 0 to about 2 mole % of a prepolymer component of formula T-G-T-G-T-G-T, wherein:

G is a residue of a polyol; and

T is a residue of a diisocyanate compound;

wherein in the preparation of the melt-spinnable elastomeric polymer, which preparation comprises combining together said polyol, said diisocyanate compound and said aromatic dihydroxy compound, said polyol and said diisocyanate compound are combined together in a mole ratio of about 1:2 to provide the melt-spinnable elastomeric polymer with substantially no higher melting polymeric component.

Another aspect of the invention relates to a fiber which is melt-spun from a melt-spinnable elastomeric polymer, wherein the melt-spinnable elastomeric polymer comprises a diisocyanate-capped polyol prepolymer which is chain-extended with an aromatic dihydroxy compound, wherein in the preparation of said melt-spinnable elastomeric polymer, which preparation comprises combining together said polyol, said diisocyanate compound and said aromatic dihydroxy compound, said polyol and said diisocyanate compound are combined together in a mole ratio of about 1:2 to provide the melt-spinnable elastomeric polymer with substantially no higher melting polymeric component.

Yet another aspect of the invention relates to a method for the preparation of a melt-spun fiber comprising providing a melt-spinnable elastomeric polymer having the formula:

$$[Pr-Ar]_n \quad (I)$$

wherein:
n is from about 30 to about 65;
Ar is a residue of an aromatic dihydroxy compound; and
Pr is a prepolymer which comprises:
from about 85 to about 95 mole % of a prepolymer component of formula T-G-T;
from about 3 to about 15 mole % of a prepolymer component of formula T-G-T-G-T; and
from 0 to about 2 mole % of a prepolymer component of formula T-G-T-G-T-G-T, wherein:
G is a residue of a polyol; and
T is a residue of a diisocyanate compound; and
melt spinning said melt-spinnable elastomeric polymer; wherein said meltspinnable elastomeric polymer is prepared by a method which comprises combining together said polyol, said diisocyanate compound and said aromatic dihydroxy compound, wherein said polyol and said diisocyanate compound are combined together in a mole ratio of about 1:2 to provide the melt-spinnable elastomeric polymer with substantially no higher melting polymeric component.

Still another aspect of the invention relates to a method for the preparation of a melt-spun fiber comprising;
providing a melt-spinnable elastomeric polymer which comprises a diisocyanate-capped polyol prepolymer which is chain-extended with an aromatic dihydroxy compound, wherein said melt-spinnable elastomeric polymer is prepared by a method comprising combining together said polyol, said diisocyanate compound and said aromatic dihydroxy compound, wherein said polyol and said diisocyanate compound are combined together in a mole ratio of about 1:2 to provide said melt-spinnable elastomeric polymer with substantially no higher melting polymeric component; and
melt spinning said melt-spinnable elastomeric polymer to provide the fiber.

Yet another aspect of the invention relates to a melt-spinnable elastomeric polymer having the formula:

$$[Pr-Ar]_n \quad (I)$$

wherein:
n is from about 30 to about 65;
Ar is a residue of an aromatic dihydroxy compound; and
Pr is a prepolymer which comprises:
from about 85 to about 95 mole % of a prepolymer component of formula T-G-T;
from about 3 to about 15 mole % of a prepolymer component of formula T-G-T-G-T; and
from 0 to about 2 mole % of a prepolymer component of formula T-G-T-G-T-G-T, wherein:
G is a residue of a polyol; and
T is a residue of a diisocyanate compound;
wherein in the preparation of the melt-spinnable elastomeric polymer, which preparation comprises combining together said polyol, said diisocyanate compound and said aromatic dihydroxy compound, said polyol and said diisocyanate compound are combined together in a mole ratio of about 1:2 to provide the melt-spinnable elastomeric polymer with substantially no higher melting polymeric component.

Yet another aspect of the invention relates to a melt-spinnable elastomeric polymer comprising a diisocyanate-capped polyol prepolymer which is chain-extended with an aromatic dihydroxy compound, wherein in the preparation of the melt-spinnable elastomeric polymer, which preparation comprises combining together said polyol. said diisocyanate compound and said aromatic dihydroxy compound, said polyol and said diisocyanate compound are combined together in a mole ratio of about 1:2 to provide the melt-spinnable elastomeric polymer with substantially no higher melting polymeric component.

Another aspect of the invention relates to a method for the preparation of a melt-spinnable elastomeric polymer having the formula:

$$[Pr-Ar]_n \quad (I)$$

wherein:
n is from about 30 to about 65;
Ar is a residue of an aromatic dihydroxy compound; and
Pr is a prepolymer which comprises:
from about 85 to about 95 mole % of a prepolymer component of formula T-G-T;
from about 3 to about 15 mole % of a prepolymer component of formula T-G-T-G-T; and
from 0 to about 2 mole % of a prepolymer component of formula T-G-T-G-T-G-T, wherein:
G is a residue of a polyol; and
T is a residue of a diisocyanate compound;
wherein the method comprises combining together said aromatic dihydroxy compound, said polyol and said diisocyanate compound, said polyol and said diisocyanate compound being combined together in a mole ratio of about 1:2 to provide the melt-spinnable elastomeric polymer with substantially no higher melting polymeric component.

Yet another aspect of the invention relates to a method for the preparation of a melt-spinnable elastomeric polymer which comprises a diisocyanate-capped polyol prepolymer which is chain-extended with an aromatic dihydroxy compound, wherein the method comprises combining together said polyol, said diisocyanate and said aromatic dihydroxy compound, wherein said polyol and said diisocyanate are combined together in a mole ratio of about 1:2 to provide the melt-spinnable elastomeric polvmer with substantially no higher melting polymeric component.

Still another aspect of the invention relates to a method for the preparation of a melt-spinnable elastomeric polymer comprising:
(a) providing a diisocyanate-capped polyol prepolymer; and
(b) chain extending said prepolymer with an aromatic dihydroxy compound, wherein in the preparation of said prepolymer, said polyol and said diisocyanate compound are combined together in a mole ratio of about 1:2 to provide the melt-spinnable elastomeric polymer with substantially no higher melting polymeric component.

Yet another aspect of the invention relates to a prepolymer useful in the preparation of a melt-spinnable elastomeric polymer, wherein the prepolymer comprises:
from about 85 to about 95 mole % of a prepolymer component of formula T-G-T;
from about 3 to about 15 mole % of a prepolymer component of formula T-G-T-G-T; and
from 0 to about 2 mole % of a prepolymer component of formula T-G-T-G-T-G-T, wherein:
G is a residue of a polyol compound; and
T is a residue of a diisocyanate compound, wherein the prepolymer contains substantially no unreacted diisocyanate compound and wherein in the preparation of the prepolymer, said polyol and said diisocyanate compound are combined together in a mole ratio of about 1:2 to provide prepolymer which is useful in the preparation of meltspinnable elastomeric polymer containing substantially no higher melting polymeric component.

Still another aspect of the invention relates to a diisocyanate-capped polyol prepolymer useful in the preparation of a melt-spinnable elastomeric polymer, wherein the prepolymer comprises a polyol which is capped with a diisocyanate compound and contains substantially no unreacted diisocyanate compound, and wherein in the preparation of the prepolymer, said polyol and said diisocyanate compound are combined together in a mole ratio of about 1:2 to provide prepolymer which is useful in the preparation of melt-spinnable elastomeric polymer containing substantially no higher melting polymeric component.

Yet another aspect of the invention relates to a method for the preparation of a diisocyanate-capped polyol prepolymer useful for producing a melt-spinnable elastomeric polymer, wherein the method comprises:
(a) providing a polyol; and
(b) combining together with said polyol a diisocyanate compound to provide the prepolymer, wherein the prepolymer contains substantially no unreacted diisocyanate compound, and wherein said polyol and said diisocyanate compound are combined together in a mole ratio of about 1:2 to provide prepolymer which is useful in the preparation of melt-spinnable elastomeric polymer containing substantially no higher melting polymeric component.

Highly desirable and unexpected benefits are achieved with embodiments of the present invention. For example, the elastomeric polymers described herein may be melt spun into fibers having superior and advantageous properties, including superior elongation, elastic recovery, strength and heat setting properties. The methods for the preparation of the fibers of the present invention may also be simpler, less hazardous, and/or more cost-effective as compared to methods for the preparation of prior art fibers. In addition, the fibers described herein can be advantageously incorporated into textile articles having superior wear properties.

These and other aspects of the invention will become more apparent from the present description and claims.

DETAILED DESCRIPTION OF THE INVENTION

Figure 1:
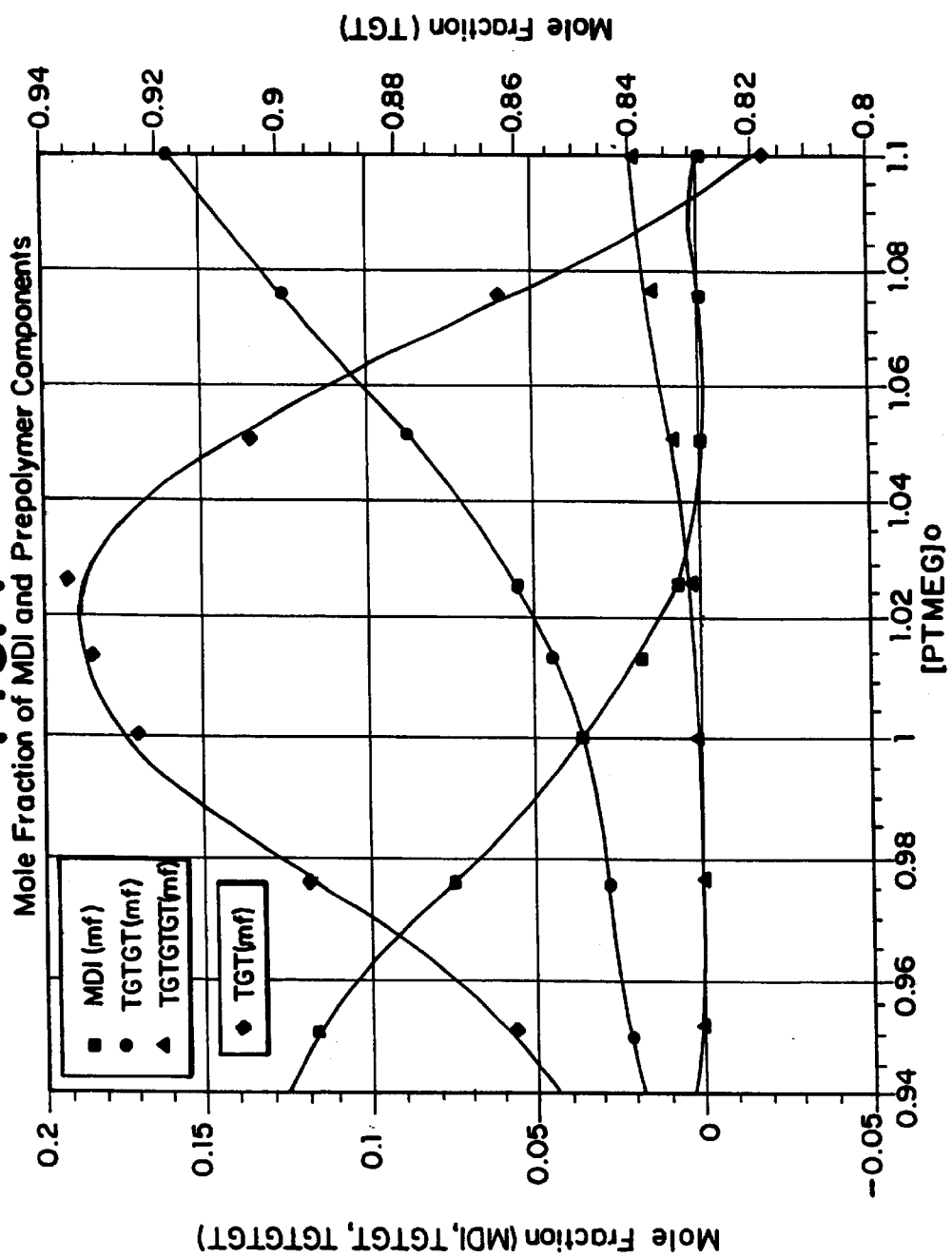
FIG. 1 is a graphical representation of kinetic simulation data of the formation of a prepolymer according to an embodiment of the present invention.

The present invention is directed, in part, to melt-spun fibers and methods for their preparation. The fibers described herein may be knitted or woven into textile articles, for example, hosiery, pantyhose, panties, sportswear, and the like. The fibers of the present invention generally exhibit a higher effective and/or superior combination of physical properties, including elongation, elastic recovery, strength and heat setting properties. Since the fibers of the present invention may be melt spun, techniques such as wet- and dry-spinning, which generally require the dissolution or dispersion of elastomeric polymers in organic solvents, including volatile organic solvents, may be avoided. Thus, the methods of the present invention may desirably avoid the health, safety and environmental concerns which are often associated with prior art methods which may involve the use of organic solvents in the preparation of fibers for use, for example, in textile articles.

The superior properties of the fibers of the present invention are believed to be due, at least in part, to one or more unique properties of the melt-spinnable elastomeric polymers from which the fibers may be prepared. The term "polymer". as used herein, refers to molecules formed from the chemical union of two or more repeating units. Accordingly, included within the term "polymer" may be, for example, dimers, trimers and oligomers, as well as higher molecular weight materials. The term "melt-spinnable" as used herein, refers to the ability of a polymer to be melted and extruded to form a fiber, preferably on a commercial scale, with substantially (including completely) no degradation and/or decomposition of the polymer. The term "substantially", as used in reference to the degradation or decomposition of the polymer during the melt-spinning process, means that less than about 25% of the polymer degrades and/or decomposes during the melt spinning process. Preferably, less than about 20% of the polymer degrades and/or decomposes during the melt spinning process, with less than about 15% being more preferred. Even more preferably, less than about 10% of the polymer degrades and/or decomposes during the melt spinning process, with less than about 5% being still more preferred. In particularly preferred embodiments, polymers may be melt spun with completely no degradation and/or decomposition (i.e., melt-spun with 0% degradation and/or decomposition).

It is contemplated that the highly superior and effective properties of the melt-spun fibers of the present invention, and of the melt-spinnable elastomeric polymers from which the fibers may be prepared, may be due, at least in part, to the absence or substantial absence of any higher melting polymeric components in the melt-spinnable elastomeric polymers. The term "higher melting polymeric component", as used herein, means polymers, including dimers, trimers, oligomers and the like, crosslinked materials, and any other by-product typically formed in connection with prior art methods for the preparation of elastomeric polymers, which may deleteriously affect one or more of the physical and/or chemical properties of the elastomeric polymers, including, for example, their melt-spinnability, elongation, elastic recovery, strength and heat setting properties, weight average molecular weight (Mw), number average molecular weight (Mn), melt index (MI), viscosity, polydispersity, and thermal properties (as exemplified, for example, by melting points and softening points). Generally speaking, the higher melting polymeric components described herein may have melting points (as determined, for example, by differential scanning calorimety (DSC)) of about 200° C. or greater, including, for example about 210° C. or greater, about 220° C. or greater, about 230° C. or greater, or about 240° C. or greater. In preferred embodiments of the present invention, the melt-spinnable elastomeric polymers contain substantially (including completely) no higher melting polymeric component. The term "substantially no", as used in reference to higher melting polymeric component, means that the melt-spinnable elastomeric polymers described herein may contain higher melting polymeric components in amounts low enough such that the elastomeric polymers have desirable and advantageous properties, including, for example desirable and advantageous melt-spinnability, elongation, elastic recovery, strength and heat setting properties, weight average molecular weight (Mw), number average molecular weight (Mn), melt index (MI), viscosity, polydispersity, and thermal properties (as exemplified, for example, by melting points and softening points), to name just a few. As discussed in detail below, it is contemplated that the absence or substantial absence of higher melting polymeric components in the melt-spinnable elastomeric polymers described herein may be due to the highly advantageous and unique methods employed in connection with their preparation. In preferred embodiments, the melt-spinnable elastomeric polymers described herein may contain less than about 5% by weight of higher melting polymeric component. More preferably, the present melt-spinnable elastomeric polymers may contain less than about 4% by weight of higher melting polymeric component, with less than about 3% by weight being even more preferred. Still more preferably, the present melt-spinnable elastomeric polymers may contain less than about 2% by weight of higher melting polymeric component, with less than about 1% by weight being especially preferred. In particularly preferred embodiments, the present melt-spinnable elastomeric polymers may contain completely no higher melting polymeric component (i.e., 0% higher melting polymeric component).

The melt-spinnable elastomeric polymers described herein may exhibit desirable and advantageous properties which may make them particularly suitable for use in the preparation of fibers as described herein. Such properties have generally been unavailable heretofore in elastomeric polymers, particularly in elastomeric polymers which may be melt-spun into fibers. For example, the polymers of the present invention may be characterized, for example, by a broad molecular weight distribution. It is contemplated that the weight average molecular weight (Mw) of the present elastomeric polymers may be highly important in providing desirable properties including, for example, desirable melt-spinnability, melt index and viscosity, as well as desirable properties in fibers melt-spun from the polymers, such as, for example, desirable elongation, elastic recovery, strength, and heat setting properties. Generally speaking, the weight average molecular weights of the melt spinnable elastomeric polymers of the present invention may vary depending, for example, on the reactive components from which a particular polymer may be prepared, as well as the particular methods which may be employed in preparing the polymers. In preferred embodiments, the melt-spinnable elastomeric polymers of the present invention may have a weight-average molecular weight which ranges from about 80,000 to about 175,000, and all combinations and subcombinations of ranges therein. More preferably, the melt-spinnable elastomeric polymers of the present invention may have a weight average molecular weight of from about 90,000 to about 150,000, with weight average molecular weights of from about 100,000 to about 145,000 being even more preferred. In particularly preferred embodiments, the melt-spinnable elastomeric polymers of the present invention may have a weight average molecular weight of from about 110,000 to about 135,000.

Molecular weight is inversely proportional to the melt index (MI). Thus, in addition to the weight average molecular weights of the melt spinnable elastomeric polymers of the present invention, the melt index of the polymers may also be highly important to provide desirable and advantageous properties of the polymers including, for example, desirable melt-spinnability and viscosity, as well as desirable properties in fibers melt-spun from the polymers, such as, for example, desirable elongation, elastic recovery, strength, and heat setting properties. Generally speaking, as with the weight average molecular weights, the melt index of the melt spinnable elastomeric polymers of the present invention may vary depending, for example, on the reactive components from which a particular polymer may be prepared, as well as the particular methods which may be employed in preparing the polymers. In preferred embodiments, the present polymers may have a melt index of from about 1.5 to less than about 32, and all combinations and subcombinations of ranges therein. More preferably, the present polymers may have a melt index of from about 2 to about 25, with a melt index of from greater than about 2 to about 20 being even more preferred. Still more preferably, the elastomeric polymers of the present invention may have a melt index of from about 5 to about 15.

In addition to weight average molecular weights and melt index properties. another property which may be highly important in providing desirable and advantageous properties in the melt spinnable elastomeric polymers of the present invention. as described above, is the viscosity of the polymers. Generally speaking, as with the properties discussed above, the viscosity of the melt spinnable elastomeric polymers of the present invention may vary depending, for example, on the reactive components from which a particular polymer may be prepared, as well as the particular methods which may be employed in preparing the polymers. In preferred embodiments, the viscosity of the polymers of the present invention, which is preferably determined at a shear stress of about $1.94 \times 10^4$ Pascal, may range from about 500 to about 10,000 Pascal seconds (Pa·s), and all combinations and subcombinations of ranges therein. More preferably, the present elastomeric polymers may have a viscosity of from greater than about 750 to about 7500 Pa·s, with viscosities of from about 1000 to about 5000 Pa·s being even more preferred. In particularly preferred embodiments, the melt-spinnable elastomeric polymers of the present invention may have a viscosity of from about 1100 to about 3000 Pa·s.

Another property which may be highly important in achieving desirable and advantageous properties of the polymers including, for example, desirable melt-spinnability, melt index and viscosity, as well as properties in fibers melt-spun from the polymers, such as, for example, desirable elongation, elastic recovery, strength, and heat setting properties, is the number average molecular weight (Mn). Generally speaking, the number average molecular weights of the melt spinnable elastomeric polymers of the present invention may vary depending, for example, on the reactive components from which a particular polymer may be prepared, as well as the particular methods which may be employed in preparing the polymers. In preferred embodiments, the melt-spinnable elastomeric polymers of the present invention may have a number average molecular weight ranging from about 20,000 to about 35,000, and all combinations and subcombinations of ranges therein. More preferably, the melt-spinnable elastomeric polymers of the present invention may have a number average molecular weight of from greater than about 20,000 to less than about 35,000. Even more preferably, the present polymers may have a number average molecular weight of from about 24,000 to about 30,000.

Yet another property which may be highly important in achieving desirable and advantageous properties of the present polymers and fibers prepared therefrom is the polydispersity. Polydispersity may be obtained by dividing the weight average molecular weight (Mw) by the number average molecular weight (Mn). As with the properties discussed above, the polydispersity of the melt spinnable elastomeric polymers of the present invention may vary depending, for example, on the reactive components from which a particular polymer may be prepared, as well as the particular methods which may be employed in preparing the polymers. In preferred embodiments, the melt-spinnable elastomeric polymers of the present invention may have a polydispersity which ranges from about 4 to less than about 6, and all combinations and subcombinations of ranges therein. More preferably, the melt-spinnable elastomeric polymers of the present invention may have a polydispersity of from about 4 to about 5, with polydispersities of from about 4.2 to about 4.8 being even more preferred.

The melt-spinnable elastomeric polymers of the present invention possess highly desirable and advantageous thermal characteristics as exemplified by their melting and softening profiles. These melting and softening characteristics may make the polymers described herein particularly suitable for use as fibers which can be knitted and/or woven into textile articles. Extrudable prior art elastomeric polymers, on the other hand, typically possess lower melting and softening characteristics which may limit their use in fibers and textile products. For example, prior art elastomeric polymers typically possess melting.points in the range of from about 120° C. to about 150° C., and softening points of about 100° C. Such low melting and softening temperatures may provide textile products which are thermally unstable, and which are readily prone to melting or to softening and becoming misshapen upon exposure to slightly elevated process and use temperatures.

Due to the generally undesirable melting and softening profiles of prior art elastomeric polymers, it has generally been necessary to employ reactive spinning in connection with the preparation of fibers therefrom. In reactive spinning, a prepolymer or other crosslinker is injected into a stream of molten, thermoplastic polymer such as, for example, polyurethane polymer, immediately prior to the spin pack. The crosslinker, which is typically an isocyanate capped prepolymer, may react with urethane units to form allophanates. Although other chemistries may be involved, crosslinks formed in reactive spinning are generally irreversible. Such crosslinks are often necessary to improve the thermal stability of the prior art polymers and/or fibers.

The elastomeric polymers of the present invention possess melting profiles which may desirably permit the formation of thermally stable fibers without the use of reactive spinning techniques. Accordingly, additional process steps and chemistries may be desirably and advantageously avoided with the polymers and methods of the present invention. The methods described herein may therefore be more cost-effective and less complex as compared to methods of the prior art. In preferred form, the elastomeric polymers of the present invention may possess highly defined melting points. Preferably, the present elastomeric polymers may have melting points of greater than about 160° C. More preferably, the present polymers may have melting points which range from greater than about 160° to about 200° C., and all combinations and subcombinations of ranges therein. Even more preferably, the present polymers may have melting points of from about 170° C. to less than about 200° C., with melting points of from about 180° C. to about 195° C. being yet more preferred.

As noted above, the polymers of the present invention are also preferably characterized by highly advantageous softening points. Preferably, the present polymers may have softening points of greater than about 130° C., with softening points of greater than about 140° C. being more preferred. Even more preferably, the polymers of the present invention may have softening points of greater than about 150° C.

As discussed in detail above, melt-spinnable elastomeric polymers of the present invention preferably contain substantially no higher melting component including, for example, polymeric components which melt at temperatures above about 200° C. Prior art methods for preparing polymers using polyols, diisocyanate compounds and aromatic dihydroxy compounds, including those described herein, generally provide elastomeric polymers which contain higher melting polymeric components in amounts which may be greater and, often, significantly greater, than that which may be provided with the methods of the present invention.

In accordance with a preferred embodiment of the present invention, there is provided a melt-spun fiber which may be prepared from a melt-spinnable elastomeric polymer. In preferred embodiments, the melt-spinnable elastomeric polymer described herein comprises a polyurethane polymer, with thermoplastic polyurethane polymers being more preferred. Broadly speaking, the melt-spinnable elastomeric polymers from which the fibers may be prepared comprise a prepolymer, preferably a diisocvanate-capped polyol prepolymer, which is preferably chain-extended with an aromatic dihydroxy compound. The term "diisocyanate-capped polyol prepolymer" refers generally to a prepolymer which comprises a polyol that has been combined together with a diisocyanate compound (i.e., a compound containing at least two isocyanate (—NCO) groups). In preferred form, the prepolymer is prepared so as to contain substantially no unreacted diisocyanate compound. The term "unreacted diisocyanate compound" refers to free monomeric diisocyanate compound, i.e., diisocyanate compound which is employed as a starting material in connection with the preparation of the prepolymer and which remains unreacted in the prepolymer composition. The term "polyol" as used herein, generally refers to a polymeric compound having more than one hydroxy (—OH) group, preferably an aliphatic polymeric compound which is terminated at each end with a hydroxy group. A wide variety of polyol compounds is available for use in the preparation of the prepolymer. In preferred embodiments, the polyol may comprise a polymeric diol including, for example, polyether diols and polyester diols and mixtures or copolymers thereof. Preferred polymeric diols are polyether diols, with polyalkylene ether diols being more preferred. Exemplary polyalkylene polyether diols include, for example, polyethylene ether glycol, polypropylene ether glycol, polytetramethylene ether glycol and polyhexamethylene ether glycol and nixtures or copolymers thereof. Preferred among these polyalkylene ether diols is polytetramethylene ether glycol (PTMEG). Preferred among the polyester diols are, for example, polybutylene adipate glycol and polyethylene adipate glycol and mixtures or copolymers thereof. Other polyol compounds, in addition to those exemplified above, would be readily apparent to one of ordinary skill in the art, once armed with the present disclosure.

The number average molecular weight of the polyols from which the prepolymers may be derived may range from about 800 to about 3500 and all combinations and subcombinations of ranges therein. More preferably, the number average molecular weights of the polyol may range from about 1500 to about 2500, with number average molecular weights of about 2000 being even more preferred.

As noted above, the polyol in the prepolymer is preferably capped with a diisocyanate compound. A wide variety of diisocyanate compounds is available for use in the preparation of the prepolymers of the present invention. Generally speaking, the diisocyanate compound may be aromatic or aliphatic, with aromatic diisocyanate compounds being preferred. Examples of suitable aromatic diisocyanate compounds include diphenylmethane diisocyanate, xylene diisocyanate, toluene diisocyanate, phenylene diisocyanate, and naphthalene diisocyanate and mixtures thereof Examples of suitable aliphatic diisocyanate compounds include dicyclohexylmethane diisocyanate and hexamethylene diisocyanate and mixtures thereof. Preferred among the diisocyanate compounds is diphenylmethane diisocyanate (MDI) due, at least in part, to its general commercial availability and high degree of safety, as well as its generally desirable reactivity with chain extenders (discussed more filly hereinafter). Other diisocyanate compounds, in addition to those exemplified above, would be readily apparent to one of ordinary skill in the art, once armed with the present disclosure.

In connection with a preferred embodiment of the invention, the prepolymer from which melt-spinnable elastomeric polymer and fibers may be derived may comprise one or more different components, the prepolymer components differing from each other based on the amounts of polyol and diisocyanate compound included therein. In preferred form, the prepolymer (which may also be abbreviated herein as "Pr") may comprise:

from about 85 to about 95 mole % of a prepolymer component of formula T-G-T;

from about 3 to about 15 mole % of a prepolymer component of formula T-G-T-G-T; and from 0 to about 2 mole % of a prepolymer component of formula T-G-T-G-T-G-T, wherein:
G is a residue of a polyol; and
T is a residue of a diisocyanate compound.

As noted above, the prepolymers from which melt-spinnable elastomeric polymers and fibers may be prepared may comprise from about 85 to about 95 mole % of a prepolymer component of formula T-G-T. Preferably, the prepolymers may comprise from about 90 to about 94 mole % of a prepolymer component of formula T-G-T, with about 92 to about 94 mole % being even more preferred.

In addition to the prepolymer component of formula T-G-T, the prepolymers from which melt-spinnable elastomeric polymers and fibers may be prepared may futher comprise from about 3 to about 15 mole % of a prepolymer component of formula T-G-T-G-T. Preferably, the prepolymers may comprise from about 3 to about 7 mole % of a prepolymer component of formula T-G-T-G-T, with about 3 to about 5 mole % being even more preferred.

As set forth above, the prepolymers from which melt-spinnable elastomeric polymers and fibers may be prepared may further comprise from 0 to about 2 mole % of a prepolymer component of formula T-G-T-G-T-G-T. Preferably, the prepolymers may comprise from about 0 to about 1 mole % of a prepolymer component of formula T-G-T-G-T-G-T, with about 0 to about 0.5 mole % being even more preferred.

In the formulas T-G-T, T-G-T-G-T and T-G-T-G-T-G-T, the term "T" is a residue of a diisocyanate compound. The term "residue", as used herein in connection with the term T, refers to a chemical group or moiety that is derived from a diisocyanate compound. Exemplary diisocyanate compounds which may be employed in the preparation of the prepolymer include, for example, the diisocyanate compounds listed above.

Also in the formulas T-G-T, T-G-T-G-T and T-G-T-G-T-G-T, the term "G" is a residue of a polyol. The term "residue", as used herein in connection with the term G, refers to a chemical group or moiety that is derived from a polyol. Exemplary polyols which may be employed in the preparation of the prepolymer include, for example, the polyols listed above.

As noted above, the diisocyanate-capped polyol prepolymer is preferably chain-extended with an aromatic dihydroxy compound to provide the melt-spinnable elastomeric polymers of the present invention. A wide variety of aromatic dihydroxy compounds is available for use in the elastomeric polymers of the present invention. Exemplary aromatic dihydroxy compounds include, for example, 1,4-bis($\beta$-hydroxyethoxy)benzene (also referred to as hydroquinone bis(hydroxyethyl)ether or HQEE), bis($\beta$-hydroxyethoxy)terephthalate and p-xylylenediol. Preferred among these compounds is HQEE due, at least in part, to its commercial availability. In addition, melt-spinnable elastomeric polymers prepared from HQEE may be preferred in that they may have especially desirable thermal properties, as exemplified by their softening and melting profiles, as discssed above.

It has been found that lower cost commercial grades of HQEE may be employed in the methods described herein without serious deleterious effects. For example, PM:00384-00 hydroquinone bis(hydroxyethyl)ether, commercially available from Eastman Chemical Co. (Kingsport, Tenn.), contains at least about 85% by weight HQEE and about 15% (or less) by weight 2-(4-(2-(2-hydroxyethoxy)ethoxy) phenoxy)-ethanol and 4-(2-hydroxyethoxy)phenol). Melt-spinnable elastomeric polymer obtained from this lower cost commercial grade form of HQEE have about the same performance characteristics as compared to melt-spinnable elastomeric polymer obtained with purer forms of HQEE.

Other dihydroxy aromatic compounds, in addition to those exemplified above, would be readily apparent to one of ordinary skill in the art, once armed with the present disclosure.

In accordance with a preferred embodiment of the invention, the melt-spinnable elastomeric polymers from which the fibers may be derived, which preferably comprise diisocyanate-capped polyol prepolymer chain extended with an aromatic dihydroxy compound, has the following formula:

[Pr–Ar]$_n$             (I)

wherein:

n is from about 30 to about 65;

Ar is a residue of an aromatic dihydroxy compound; and

Pr is a prepolymer.

In the above formula (I), n is an integer which ranges from about 30 to about 65, and all combinations and subcombinations of ranges therein. Preferably, n is an integer from about 33 to about 56, with integers from about 37 to about 54 being more preferred. Even more preferably, n is an integer from about 40 to about 50.

Also in formula (I) above, Ar is preferably a residue of an aromatic dihydroxy compound. The term "residue", as used herein in connection with the term Ar, refers to a chemical group or moiety that is derived from an aromatic dihydroxy compound, i.e., an aromatic compound containing at least two hydroxy (—OH) groups. Exemplary aromatic dihydroxy compounds include those listed above.

In formula (I) above, Pr represents a prepolymer such as, for example, the prepolymers listed above. Preferably, Pr is a prepolymer which comprises from about 85 to about 95 mole % of a prepolymer component of formula T-G-T, where T and G are as defined above, with about 90 to about 94 mole % being more preferred. Even more preferably, Pr comprises from about 92 to about 94 mole % of a prepolymer component of formula T-G-T.

Also in formula (I) above, the prepolymer Pr preferably comprises from about 3 to about 15 mole % of a prepolymer component of formula T-G-T-G-T, with about 3 to about 7 mole % being more preferred. Even more preferably, Pr comprises from about 3 to about 5 mole % of a prepolymer component of formula T-G-T-G-T.

In formula (I) above, the prepolymer Pr preferably comprises from 0 to about 2 mole % of a prepolymer component of formula T-G-T-G-T-G-T, with from 0 to about 1 mole % being more preferred. Even more preferably, Pr comprises from about 0 to about 0.5 mole % of a prepolymer component of formula T-G-T-G-T-G-T.

A wide variety of methods is available for preparing the prepolymers, melt-spinnable elastomeric polymers and the melt-spun fibers of the present invention. Broadly speaking, preferred melt-spinnable elastomeric polymers, which may comprise a diisocyanate-capped polyol prepolymer which is chain-extended with a aromatic dihydroxy compound, may be prepared by combining together polyol, diisocyanate and aromatic dihydroxy compounds. Broadly speaking, the terms "combining together" or "combined together", as used herein in reference to the preparation of the present elastomeric polymers, means that all of the reactants, including any catalysts and optional additives, may be combined and mixed together at about the same time, preferably at an elevated temperature and for a time to provide the melt-spinnable elastomeric polymer (or prepolymer thereto). In preferred embodiments, the terms "combining together" or "combined together" means that the various reactants, catalysts and optional additives may be combined in one or more preferential sequences, each sequence being preferably conducted at an elevated temperature and for a time to provide the desired product. In particularly preferred form, the preparation of a diisocyanate-capped polyol prepolymer which is chain-extended with a aromatic dihydroxy compound, which represents a preferred melt-spinnable elastomeric polymer in accordance with the present invention. preferably involves the initial preparation of the prepolymer. The preparation of the prepolymer may comprise, for example, a batch method, which may involve combining together a polyol with a diisocyanate compound, including the exemplary polyols and diisocyanate compounds described above. The diisocyanate compound and polyol are preferably heated to a temperature and for a time to form the diisocyanate-capped polyol prepolymer. Generally speaking, preparation of the prepolymer may involve combining together and heating the diisocyanate compound and polyol to a temperature from about 125° C. to about 220° C., with temperatures from about 150° C. to about 210° C. being preferred. More preferably, the diisocyanate compound and polyol may be heated to a temperature of about 170° C. to about 190° C. In addition, the diisocyanate compound and polyol may be combined together and heated to elevated temperatures for a time of about 20 minutes to about 1 hour, with times of about 30 minutes to about 45 minutes being preferred.

In connection with the batch method, the diisocyanate-capped polyol prepolymer may then preferably be combined together with an aromatic dihydroxy compound. Preferably, this involves adding the aromatic dihydroxy compound to the diisocyanate-capped polyol prepolymer which has been heated to an elevated temperature, preferably to at least about 190° C., and more preferably, to a temperature from about 190° C. to about 220° C. Even more preferably, the prepolymer is heated to a temperature of about 200° C. to about 210° C. prior to addition of the aromatic dihydroxy compound. The diisocyanate-capped polyol prepolymer and the aromatic dihydroxy compound may be combined together and heated to elevated temperatures, including the temperatures exemplified above, for a time of about 5 minutes to about 20 minutes, with times of about 10 minutes to about 15 minutes being preferred.

It has been surprisingly and unexpectedly found that a predetermined sequential addition of reactants, as well as careful stoichiometric control of the reactants, and preferably, precise stoichiometric control of the reactants, may provide the prepolymer and melt-spinnable elastomeric polymers having desirable and superior properties, including those properties described herein such as, for example, the absence or substantial absence, of higher melting polymeric components in the melt-spinnable elastomeric polymers. Generally speaking, in connection with the preparation of the prepolymer, the polyol and the diisocyanate compound are preferably combined together initially to provide the prepolymer, as discussed above. Preferably. the polyol and the diisocyanate compound are combined together in a manner to provide the prepolymer with substantially (including completely) no unreacted diisocyanate compound. The term "substantially no", as used herein with reference to unreacted diisocyanate compound, means that the prepolymers described herein may preferably contain significantly low amounts of unreacted diisocyanate compound. Preferably, the amount of unreacted diisocyanate compound present in the prepolymer is such that the prepolymer may be advantageously and desirably utilized to provide the melt-spinnable elastomeric polymer with substantially no higher melting polymeric components, as discussed above. While the inventors do not wish to be bound by any theory or theories of operation, it is believed that the undesirable presence in the prepolymer of unreacted diisocyanate compound, in amounts greater than those described herein, may undesirably result in the formation of higher melting polymeric components, including, for example, higher melting dimers, trimers, oligomers, and the like. Such higher melting polymeric components may be formed, for example, from the reaction of excess unreacted diisocyanate compound with, for example, aromatic dihydroxy compound, as discussed more filly hereinafter.

Preferably, the diisocyanate compound and the polyol may be combined together and preferably reacted together by heating to a temperature and for a time to provide prepolymer containing less than about 4 mole % unreacted diisocyanate compound. More preferably, the diisocyanate compound and the polyol may be combined together and the resulting mixture may be heated to a temperature and for a time to provide prepolymer containing less than about 3 mole % unreacted diisocyanate compound, with less than about 2 mole % being even more preferred. Still more preferably, the diisocyanate compound and the polyol may be combined together and heated to a temperature and for a time to provide prepolymer containing less than about 1 mole % unreacted diisocyanate compound. In particularly preferred embodiments, the diisocyanate compound and the polyol may be combined together and heated to a temperature and for a time to provide prepolymer which contains completely no unreacted diisocyanate compound (i.e., 0 mole % unreacted diisocyanate compound).

It has been found that obtaining prepolymer containing substantially no unreacted diisocyanate compound may be achieved, at least in part, by combining together the polyol and the diisocyanate compound in a mole ratio of about 1.2. The term "about 1:2", as used herein in connection with the mole ratio of polyol to diisocyanate compound, means that the polyol and diisocyanate compound are preferably combined in a mole ratio of about 2 moles of diisocyanate compound for each mole of polyol. In preferred embodiments, the term "about 1.2" means that the polyol and the diisocyanate compound are combined in a mole ratio ranging from about 0.98:2.00 to about 1.05:2.00, and all combinations and subcombinations of ranges therein. In particularly preferred embodiments, the term "about 1.2" means that the polyol and the diisocyanate compound are combined in a mole ratio of from about 1.00:2.00 to about 1.05:2.00.

As noted above, after formation of the prepolymer, the prepolymer is preferably combined with the aromatic dihydroxy compound. The resulting mixture of prepolymer and aromatic dihydroxy compound is preferably heated at a temperature and for a time to provide the melt-spinnable elastomeric polymers. The amount of aromatic dihydroxy compound which is combined with the prepolymer to provide the melt-spinnable elastomeric polymer may vary depending, for example, on the particular reactants which may be employed in elastomeric polymers including, for example, polyol, diisocyanate compound and aromatic dihdroxy compound, as well as additional optional reactants, such as branching agent and chain terminators, as discussed below. Generally speaking, the aromatic dihydroxy compound may be employed in the present methods in an amount to provide a molar ratio of aromatic dihydroxy compound to polyol of about 1:1. If desired, a slight deficiency of aromatic dihydroxy compound, relative to polyol, may be employed to provide a molar ratio of from about 0.98:1.00 aromatic dihydroxy compound:polyol. As noted above, this ratio may vary depending on the particular reagents, as well as the precise methods, employed in the preparation of the melt-spinnable elastomeric polymers.

While the inventors do not wish to be bound by any theory or theories of operation, it is believed that preparatory methods involving a predetermined sequential combination of reagents, including, for example, the initial preparation of prepolymer, followed by chain extension, as well as stoichiometric control of reagents, including, for example, stoichiometric control of polyol and diisocyanate compound, is preferred, at least in part, due to the reactivities of the various reagents involved. For example, the reaction of, for example, MDI, which represents a preferred diisocyanate compound in accordance with a preferred embodiment of the invention, with HQEE, which represents a preferred aromatic dihydroxy compound in accordance with a preferred embodiment of the invention, is about two orders of magnitude faster than the reaction of MDI with. for example, PTMEG, including PTMEG of about 2000 molecular weight, which represents a preferred polyol in accordance with embodiments of the present invention. Accordingly. combining together, for example, PTMEG, MDI and HQEE, at about the same time, and in molar ratios of, for example, 1:2:1, generally results in the undesired reaction of MDI with HQEE to form higher melting polymeric components, including dimers, trimers, and higher oligomers having melting points greater than about 235° C. The dimers, trimers and higher oligomers of MDI and HQEE may then react with PTMEG, which also may have become significantly extended into oligomers due to the resulting excess of slower reacting PTMEG. The polymers obtained by this "one shot" method, which is often employed in prior art methods for preparing elastomeric polymers, are generally tacky and, as noted above, contain higher melting polymeric components. As a result, polymers prepared by the one-shot method generally cannot be melt-spun into fibers, particularly fibers having the desirable and advantageous properties as described herein. In addition, methods of the prior art, including methods in which a prepolymer, such as a prepolymer of a polyol and a diisocyanate compound, are chain-extended with an aromatic glycol, generally do not involve the use of the preferred stoichiometry desirably provided in accordance with the present invention.

The criticality of the stoichiometry which may be involved in the methods described herein is depicted graphically in FIG. 1 in which there is shown kinetic simulation data of prepolymer formation involving MDI (a preferred diisocyanate compound) and PTMEG having a molecular weight of about 2000 (a preferred polyol). Inspection of FIG. 1 reveals that, at a PTMEG to MDI mole ratio of about 1.00 to about 2.00, there is present at the completion of prepolymer formation less than about 4 mole % of unreacted MD, about 92 mole % of the prepolymer component T-G-T, and about 4 mole % of the prepolymer component T-G-T-G-T. FIG. 1 also reveals that, at a PTMEG to MDI mole ratio of about 1.05 to about 2.00, there is present at the completion of prepolymer formation about 0 mole % MDI, about 90.5 mole % of prepolymer component T-G-T, about 8.5 mole % of prepolymer component T-G-T-G-T, and about 1 mole % of the prepolymer component T-G-T-G-T-G-T. As discussed above, prepolymer containing substantially no unreacted MDI may afford, upon chain extension, melt-spinnable elastomeric polymer containing substantially no (i.e., preferably less than about 5% by weight) of higher melting polymeric component. An increase in the molar ratio of "soft segment" (i.e., polyol) to MDI, as in the case of increasing the ratio from 1.00:2.00 to 1.05:2.00, would provide a prepolymer which, when chain extended with, for example. HQEE, would result in a melt-spinnable elastomeric polymer having a lower initial modulus and higher elongation, generally due to the longer soft segment.

As noted above, catalysts may also be employed in the preparation of the prepolymer, as well as in the chain extension of the prepolymer to provide the present melt-spinnable elastomeric polymers. The use of catalysts may be preferred as they may promote completion of the capping reaction of the polyol with the diisocyanate compound. Catalysts may also desirably increase the rate at which the prepolymer is chain extended with, for example, the aromatic dihydroxy compound. In preferred embodiments, the catalysts employed comprise hindered tertiary amine compounds. It is contemplated that hindered amine compounds may activate the reaction of isocyanate groups with hydroxy groups. However, due to the steric hindrance of the amine compounds, they do not significantly increase undesirable side reactions, such as, for example, allophanate reactions. In certain preferred embodiments of the present invention, the melt-spinnable elastomeric polymers may be prepared employing a batch process (discussed in detail below). In these embodiments, a preferred hindered amine catalyst is dimorpholine diethylether (DMDEE). In certain alternate preferred embodiments of the present invention, the melt-spinnable elastomeric polymers may be prepared employing a continuous or semi-continuous process (discussed in detail below). In these embodiments, a more active amine catalyst is preferably employed instead of or in addition to DMDEE, particularly in connection with the chain extension reaction. Preferred among these more active tertiary amine catalysts are triethylene diamine (TEDA), tetramethyl butylene diamine (TMBDA) and tetramethyl ethylene diamnine (TMEDA). Other catalysts, including hindered amine catalysts, in addition to those exemplified above, would be readily apparent to one of ordinary skill in the art, once armed with the present disclosure.

If desired, a branching agent may also be employed in the preparation of the melt-spinnable elastomeric polymers of the present invention, particularly in connection with the formation of the prepolymer. It is contemplated that the branching agent may introduce limited branching to the melt-spinnable elastomeric polymers. This limited branching may, in turn, provide increased melt vicosity and/or melt strength. It has been observed also that the use of branching agents may provide spun fiber packages having reduced take-off tension. Preferred among the branching agents which may be employed in the methods of the present invention include trimethylolethane (TME) and trimethylolpropane (TMP). The amount of branching agent optionally utilized in the reaction may vary depending, for example, on the reactants and methods which may be employed in preparing the prepolymers and melt-spinnable elastomeric polymers. In preferred embodiments, the branching agent, when employed, may be utilized in an amount of about 0.05 mole % to about 0.5 mole %, based on the number of moles of polyol employed in the reaction, with amounts of about 0.1 mole % to about 0.2 mole % being preferred. More preferably, the branching agent, when employed, may be utilized in an amount of about 0.1 mole %. Other branching agents, in addition to those exemplified above, would be readily apparent to one of ordinary skill in the art, once armed with the present disclosure.

As discussed above, it is contemplated that the weight average molecular weight (Mw) and number average molecular weight (Mn) of the melt-spinnable elastomeric polymers of the present invention may be highly important in providing desirable properties of the polymers, including, for example, desirable melt-spinnability, melt index and viscosity, as well as desirable properties in fibers melt-spun from the polymers, such as, for example, desired elongation, elastic recovery, strength, and heat setting properties. In the preparation of the present elastomeric polymers, it may be desirable to include small amounts of a monofinctional chain terminator, such as diethyleneglycol butyl ether (DEGBE), to assist in controlling the molecular weight. The amount of monofuctional chain terminator optionally utilized in the preparation of the melt-spinnable elastomeric polymers may vary depending, for example, on the reactants and methods which may be employed. In preferred embodiments, the monofunctional chain terminator, when employed, may be utilized in an amount of about 0.2 mole % to about 5 mole %, based on the number of moles of polyol employed in the reaction, with amounts of about 1 mole % to about 3 mole % being preferred.

As would be apparent to one of ordinary skill in the art, once armed with the present disclosure, in order to obtain the melt-spinnable elastomeric polymers having a preferred molecular weight, as described above, substantially complete chain extension of the prepolymer is preferably achieved. To do so, it may be desirable (and often preferred) to identify accurately the total number of reactive sites in the various materials employed in the preparatory methods including, for example, the number of active hydroxyls in the polyol and the dihydroxy aromatic compound, and the number of active isocyanate groups in the diisocyanate compounds. To this end, hydroxyl number and isocyanate number titrations, using standard procedures well known to the skilled artisan, may be used.

It may also be desirable (and often preferred) to identify accurately the water content of the various materials employed in the methods for preparing the prepolymer and melt-spinnable elastomeric polymers, including the methods described herein. The water content of these materials may be determined using standard procedures, including Karl Fischer analysis. It has been found that the various materials should preferably have reduced amounts of water, preferably less than about 200 ppm water. This is because the presence of water in the involved reactions may affect stoichiometry, as well as lead to the formation of ureas and biurettes.

If desired, other additives may be employed in the preparation of the melt-spinnable elastomeric polymers of the present invention, including, for example, antioxidants, weathering agents, crystallization initiators, heat resistance agents, and the like. It is preferred, of course, that these optional additives, when employed, do not interfere with the preparation of the prepolymer and melt-spinnable elastomer polymers and/or the melt spinning processes.

Figure 2:
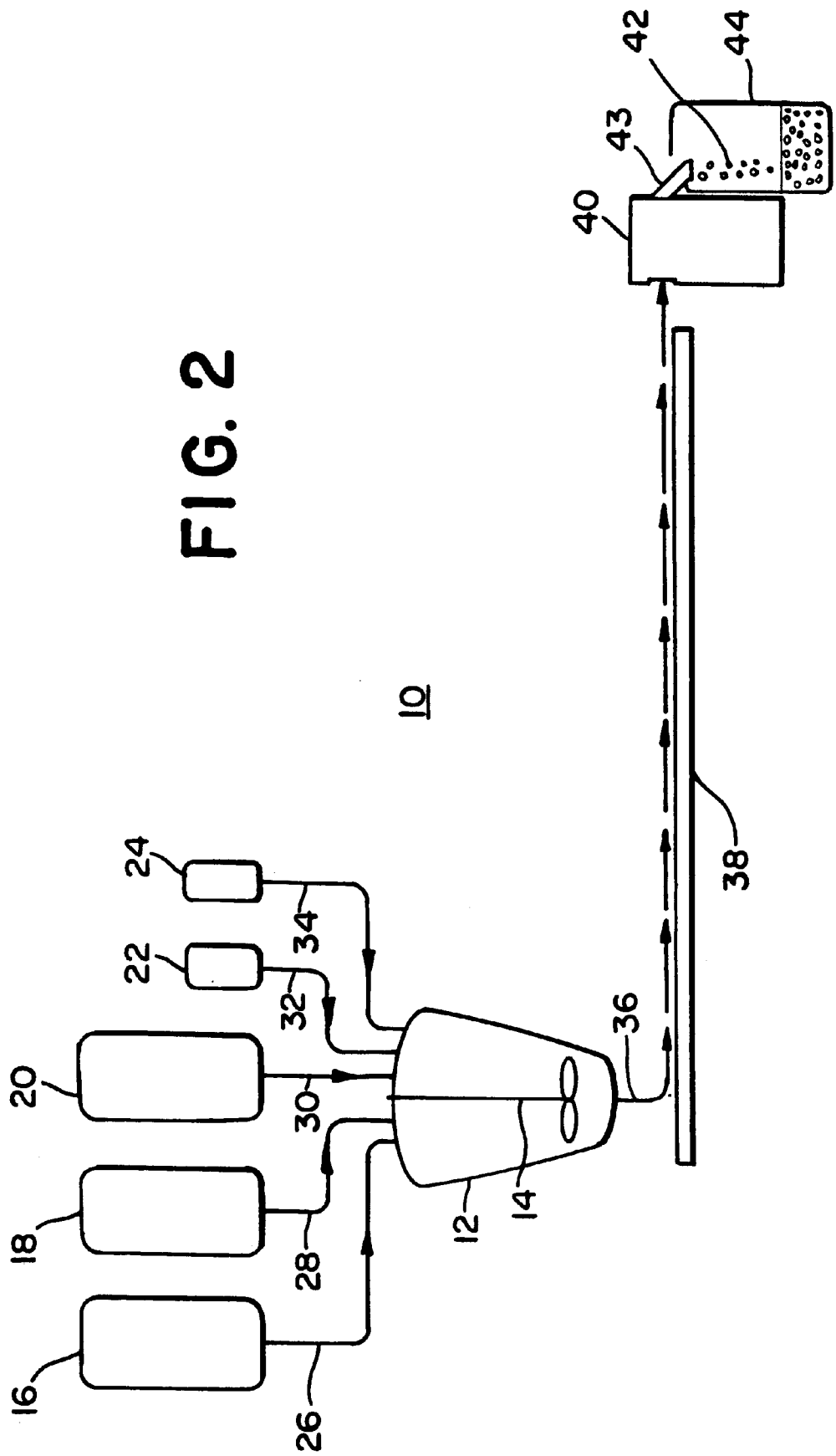
FIG. 2 is a schematic representation of a system including an apparatus for preparing a melt-spinnable elastomeric polymer in accordance with an embodiment of the present invention.

Exemplary methods which may be employed in preparing the melt-spinnable elastomeric polymers of the present invention are discussed below with reference to the process systems illustrated in the drawings. Referring to the drawings, wherein like numerals refer to like elements, FIG. 2 is a schematic representation of a batch reactor system 10 which may be used in practicing the invention. In the presently preferred embodiment, batch reactor system 10 includes batch reactor 12 outfitted with a stirrer 14. A batch reactor which is particularly suitable for use in the batch reactor system 10 described herein is a twin Helicone reactor, manufactured by Design Integrated Technologies (Warrington, Va.). In preferred form, the reactor 12 further includes heating means (not shown) and vacuum and nitrogen gas ports (not shown). The reactor system 10 includes a plurality of holding tanks represented as holding tanks 16, 18, 20, 22, 24 which may be used for holding and delivering to the reactor 12, respectively via conduits 26, 28, 30, 32, 34, the various starting materials and other reaction components which may be involved in the methods for preparing the melt-spinnable elastomeric polymers of the present invention. In the presently preferred embodiment, holding tank 16 is provided for the polyol such as, for example, PTMEG. Holding tank 18 is provided for the diisocyanate compound such as, for example, MDI, and holding tank 20 is provided for the aromatic dihydroxy compound such as, for example, HQEE. Holding tank 22 can be used to deliver to the reactor 12 one or more catalysts, and holding tank 24 can be used to deliver other optional additive agents including, for example, branching agents, antioxidants, crystllization initiators, and the like.

In a preferred embodiment for carying out the batch process, the stirrer 14 in the reactor is started and a desired amount of the polyol in the holding tank 16 and optional additives, such as branching agents, antioxidants, and the like, in the holding tank 24 are transferred to the reactor 12 via their respective conduits 26, 34. In preferred embodiments, these materials are dried in the reactor 12 prior to the addition of other reaction ingredients, for example, by heating while flushing with nitrogen and/or application of vacuum. After the drying cycle, a desired amount of the diisocyanate compound in the holding tank 18 is preferably transferred via the conduit 28 to the reactor 12. As discussed above, the polyol and the diisocyanate compound are preferably combined in a mole ratio of about 1.2. If desired, catalyst in the holding tank 22 may also be transferred to the reactor 12 via the conduit 32. The reaction mixture is preferably heated to elevated temperatures, preferably to a temperature and for a time, as described herein, to desirably drive the reaction to completion, i.e., to form the prepolymer substantially free of unreacted diisocyanate compound. After formation of the prepolymer, a desired amount of the aromatic dihydroxy compound in the holding tank 20 is preferably transferred to the reactor 12. The chain extension reaction is similarly preferably driven to completion by heating the reaction mixture to elevated temperatures, preferably to a temperature and for a time, as described herein. After completion of the chain extension reaction, molten polymer in the form of a molten polymer strand 36 is preferably discharged from the reactor 12. In the presently preferred embodiment, the molten polymer strand 36 is deposited into a water bath 38 to chill and/or quench the polymer. Also in the presently preferred embodiment, the chilled polymer strands are conveyed on a conveyor belt (not shown) to a conventional pelletizer 40 which may be used to cut the chilled polymer strand into pellets 42. The pellets 42. which are discharged from the pelletizer via discharge means 43, are preferably dried and may be melt spun or stored in a storage container 44 for melt spinning at a later time, as desired.

Figure 3:
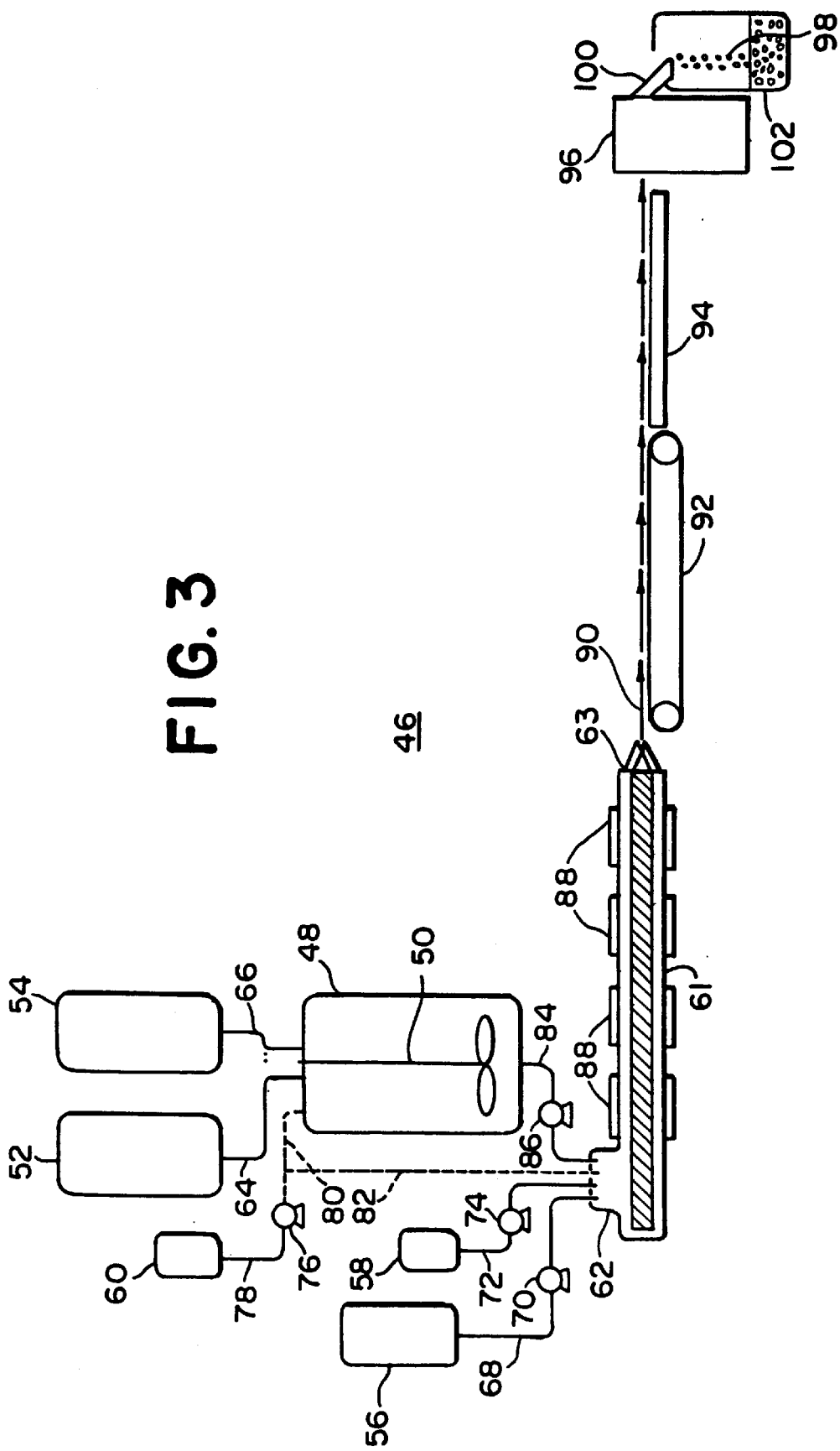
FIG. 3 is a schematic representation of a system including an apparatus for preparing a melt-spinnable elastomeric polymer in accordance with an alternate embodiment of the present invention.

Referring now to FIG. 3, there is provided a schematic representation of a semi-continuous reactor system 46 in accordance with an alternate preferred embodiment of the present invention. In the presently preferred embodiment, the reactor system 46 includes a reactor 48 outfitted with a stirrer 50. An exemplary reactor for use in this reactor system is a stainless steel jacketed reactor. In preferred form, the reactor 48 further includes heating means (not shown) and vacuum and nitrogen gas ports (not shown). As in the batch reactor system 10 discussed above, the reactor system 48 includes a plurality of holding tanks, represented as holding tanks 52, 54, 56, 58, 60, which may be used for holding and delivering to the reactor 48 and/or a twin screw extruder 61, having a proximal end 62 and a distal end 63, the various starting materials and other reaction components which may be involved in the preparation of the melt-spinnable elastomeric polymers of the present invention.

Exemplary of twin screw extruders which may be available for use in the methods described herein include those commercially available from Werner & Pfleiderer (Ramsey, N.J.). In the presently preferred embodiment, the holding tank 52 is used to deliver to the reactor 48, via conduit 64, the polyol such as, for example, PTMEG, and the holding tank 54 is used to deliver to the reactor 48, via conduit 66, the diisocyanate compound such as, for example, MDI. The holding tank 56 is used to deliver to the proximal end 62 of the screw extruder 61, via conduit 68 and through metering pump 70, the aromatic dihydroxy compound such as, for example, HQEE, and the holding tank 58 is used to deliver to the proximal end 62 of the screw extruder 61, via conduit 72 and through metering pump 14, one or more catalysts. Optional additive agents including, for example, branching agents, antioxidants, crystallization initiators, and the like, when used, are pumped out of the holding tank 60 via metering pump 76 into conduit 78. Depending, for example, on the particular materials employed in the reaction and the particular reaction conditions, the optional additives, when used, may be pumped into the reactor 48 via conduit 80 (shown as a hashed line), and/or may be pumped into the proximal end 62 of the screw extruder 61 via conduit 82 (shown as a hashed line).

The prepolymer may be prepared in a fashion similar to that employed in connection with the batch reactor system 10 as discussed above. For example. the stirrer 50 in the reactor may be started and a desired amount of the polyol in the holding tank 52 is transferred to the reactor 48 via the conduit 64. If desired, optional additives, as described above, may be transferred from the holding tank 60 to the reactor 48 via conduits 78, 80 and metering pump 76. In preferred embodiments, the polyol and optional additives are dried in the reactor 48, for example, by heating the materials while flushing with nitrogen and/or application of vacuum. After the drying cycle, a desired amount of the diisocyanate compound in the holding tank 54 is preferably transferred via the conduit 66 into the reactor 48. As discussed above, the polyol and the diisocyanate compound are preferably combined in a mole ratio of about 1.2. Also as described above in connection with the batch process 10, the reaction mixture is preferably heated to elevated temperatures for a time to drive the reaction to completion, i.e., to form the prepolymer substantially free of any unreacted diisocyanate compound.

Once prepared, the prepolymer is preferably fed from the reactor 48, via conduit 84 and metering pump 86, into the proximal end 62 of the screw extruder 61. The desired amounts of the aromatic dihydroxy compound and the catalyst are also preferably fed from their respective holding tanks 56, 58, via their respective conduits 68, 72 and metering pumps 70, 74, into the screw extruder 61. The reaction mixture in the screw extruder 61 is preferably heated to elevated temperatures and for a time to form the melt-spinnable elastomeric polymer by passing through various heating zones 88 in the screw extruder 61. Molten polymer is preferably extruded from the distal end 63 of the screw extruder 61 in the form of a molten polymer strand 90 and deposited onto a conveyor belt 92. The molten polymer strand 90 is preferably deposited into a water quench bath 94 to chill and/or quench the polymer. In the presently preferred embodiment, the chilled polymer strands are conveyed to a pelletizer 96, such as a conventional pelletizer, which is used to cut the polymer into pellets 98. The pellets 100, which are discharged from the pelletizer 96 via discharge means 100, are preferably dried and may be melt spun or stored in a storage container 102 for melt spinning at a later time, as desired.

Figure 4:
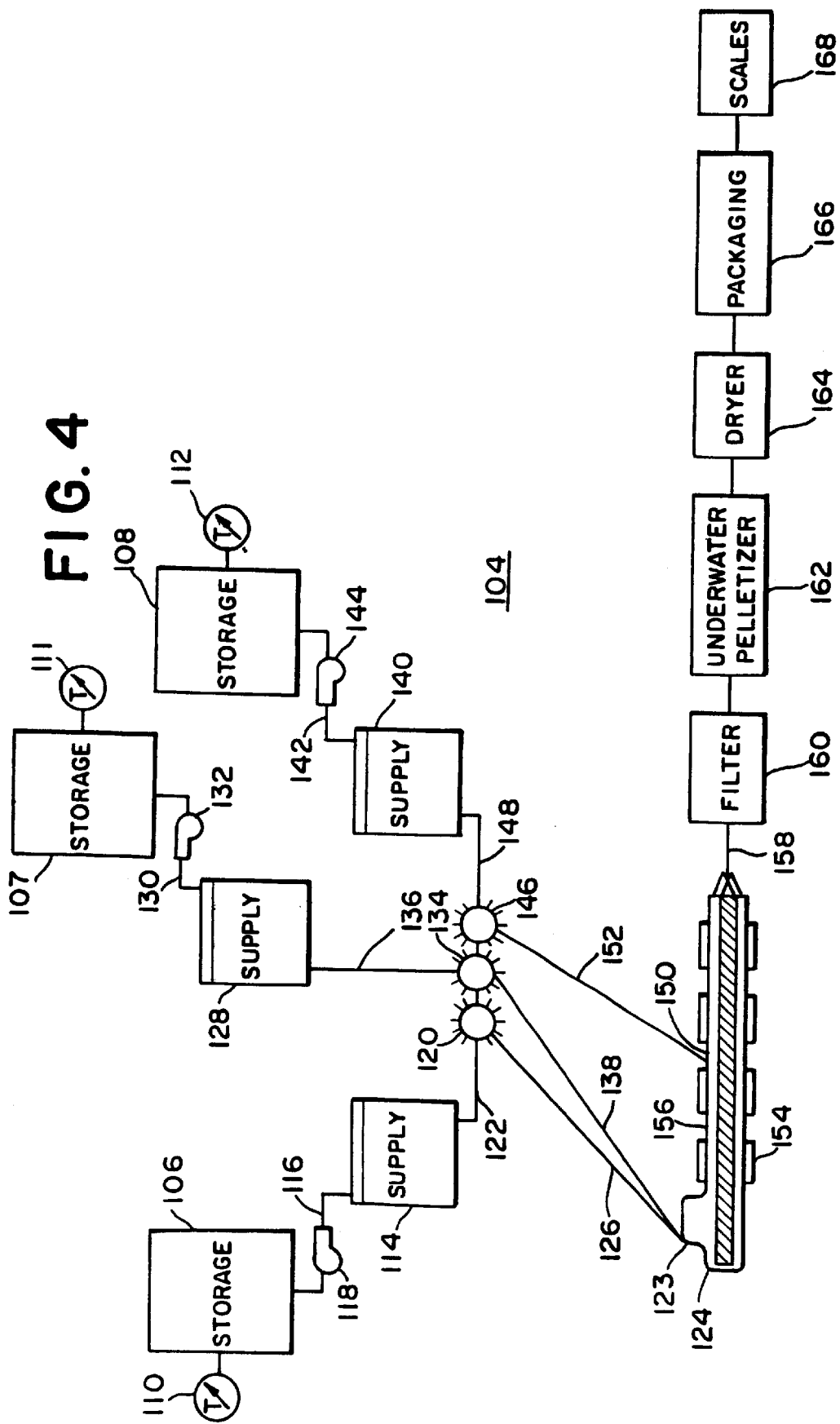
FIG. 4 is a schematic representation of a system including an apparatus for preparing a melt-spinnable elastomeric polymer in accordance with another alternate embodiment of the present invention.

With reference to FIG. 4, there is shown therein a schematic representation of a continuous process system 104 in accordance with another alternate preferred embodiment of the present invention. As would be apparent to one of ordinary skill in the art, once armed with the teachings in the present disclosure, continuous process systems, including the continuous process system exemplified in FIG. 4. may be preferred for the preparation of melt-spinnable elastomeric polymer. Continuous process systems may assist in avoiding repeated start-up or shut-down phases, for example over holidays and weekends, which often lead to increased wastage of raw materials and inefficient use of process systems. In the presently preferred embodiment, the continuous process system 104 includes storage means 106, 107, 108 for storing large amounts of the polyol (for example, PTMEG), diisocyanate compound (for example, MDI), and chain extender (for example, HQEE), respectively. Each of the storage means 106, 107, 108 preferably includes a heating means (not shown) for heating the contents of the storage means, as well as a nitrogen gas inlet (not shown) and venting means (not shown). Each of the storage means 106, 107, 108 also preferably includes a temperature detecting means 110, 111, 112 for constant monitoring of the temperature of the polyol, diisocyanate compound and aromatic dihydroxy compound respectively stored therein.

In use, the polyol in the storage means 106 is preferably delivered to supply means 114 via conduit 116 and supply pump 118. The supply means 114 preferably includes a heating means (not shown) for heating the polyol contained therein, as well as a nitrogen gas inlet (not shown) and venting means (not shown). The supply means 114 also preferably includes a level control (not shown) for controlling the amount of polyol which is maintained in the supply means 114 and which is delivered thereto from the storage means 106. In preferred form, the supply means 114 delivers the polyol to metering pump 120 via conduit 122. The metering pump 120, in turn, delivers the polyol to a twin screw extruder 123, having proximal end 124 and distal end 125, via conduit 126. Similarly, the diisocyanate compound in the storage means 107 is preferably delivered to supply means 128 via conduit 130 and supply pump 132. As with the supply means 114 above, the supply means 128 preferably includes a heating means (not shown) for heating the chain extender contained therein, as well as a nitrogen gas inlet (not shown) and venting means (not shown). The supply means 128 firther preferably includes a level control (not shown) for controlling the amount of diisocyanate compound which is maintained in the supply means 128 and which is delivered thereto from the storage means 107. The supply means 128 preferably delivers the diisocyanate compound to metering pump 134 via conduit 136. The metering pump 134, in turn, delivers the diisocyanate compound to the proximal end 124 of the twin screw extruder 123 via conduit 138.

The aromatic dihydroxy compound in the storage means 108 is preferably delivered to supply means 140 via conduit 142 and supply pump 144. As with the supply means 114 and 128 above, the supply means 140 preferably includes a heating means (not shown) for heating the aromatic dihydroxy compound contained therein, as well as a nitrogen gas inlet (not shown) and venting means (not shown). The supply means 140 further preferably includes a level control (not shown) for controlling the amount of aromatic dihydroxy compound which is maintained in the supply means 140 and which is delivered thereto from the storage means 108. The supply means 140 preferably delivers the aromatic dihydroxy compound to metering pump 146 via conduit 148. The metering pump 146, in turn, delivers the aromatic dihydroxy compound to a central portion 150 of the twin screw extruder 123 (located between the proximal and distal ends 124, 125) via conduit 152. Although not shown, the continuous process system 104 may further include storage means and/or supply means, together with any associated conduits and supply and metering pumps, to deliver to the extruder 124 one or more catalysts and optional additive agents as described above in connection with the batch reactor system 10 and the semicontinuous system 46.

In carrying out the continuous process, the polyol and diisocyanate compound are delivered to the proximal end 124 of the screw extruder 123 via the conduits 126 and 138, respectively. If desired, catalyst and optional additives, as described above, may be delivered also to the screw extruder 123. The mixture of polyol and diisocyanate compound, and optional catalyst and additives, is preferably heated in the extruder from heating zones 154, preferably to a temperature and for a time to drive the reaction to completion, i.e., to form the prepolymer containing substantially no unreacted diisocyanate compound. This is preferably achieved in a portion 156 of the screw extruder 123, prior to the central portion 150. As the prepolymer approaches the central portion 150 of the screw extruder 123, the aromatic dihydroxy compound is preferably fed into the central portion 150 123 via the conduit 152. The prepolymer then desirably reacts with the aromatic dihydroxy compound to form the melt-spinnable elastomeric polymer which is preferably also extruded from the distal end 125 of the screw extruder 123 as a molten polymer strand 158. In the presently preferred embodiment, the molten polymer strand 158 may be filtered in pressure filter 160 and chilled and pelletized in underwater pelletizer 162. The pellets may then be dried in drier 164, packaged in packaging unit 166 and weighed in scales weighing unit 168.

The melt-spinnable elastomeric polymers, conveniently in the form of pellets, may be melted and extruded to form melt-spun fibers using techniques which are well known to the skilled artisan. The present polymers may be melt-spun as a monofilament fiber, or they may be processed into multifilament yarns. The fibers of the present invention may have highly desirable physical properties as measured, for example, by tenacity, elongation to break and modulus, including initial, tangent or secant modulus. In preferred form, the fibers described herein may have a tenacity of at least about 0.8 grams per denier (gpd). More preferably, the present fibers may have a tenacity which ranges from about 0.9 to about 1.7 gpd, and all combinations and subcombinations of ranges therein. Even more preferably, the present fibers may have a tenacity of from about 1 to about 1.5 gpd, with a tenacity of from about 1.1 to about 1.4 gpd being still more preferred.

As indicated above, fibers prepared from the present melt-spinnable elastomeric polymers may exhibit highly desirable elongation to break. In accordance with preferred embodiments, the present fibers may have an elongation to break, as measured off the pack, which ranges from about 400 to about 750%, and all combinations and subcombinations of ranges therein. Even more preferably, the present fibers may have an elongation to break of from about 500 to about 700%, with an elongation to break of from about 600 to about 700% being still more preferred.

Fibers prepared from the melt-spinnable elastomeric polymers of the present invention may also exhibit highly desirable secant modulus, for example, at 100% elongation. In accordance with preferrea embodiments, the present fibers may have a secant modulus which ranges from about 0.05 to about 0.3 gpd, and all combinations and subcombinations of ranges therein. More preferably, the present fibers may have a secant modulus of from about 0.05 to about 0.15 gpd, with a secant modulus of from about 0.05 to about 0.10 gpd being even more preferred.

The present fibers may be woven or knitted into textile articles according to procedures well-known to the skilled artisan. Exemplary textile articles which may be prepared from the present fibers include hosiery, pantyhose, panties, sportswear, and the like.

Analytical Testing Procedures

The following is a description of analytical testing procedures which may be employed in connection with the preparation and analysis of elastomeric fibers. melt-spinnable elastomeric polymers and prepolymers of the present invention.

Melt Index

Figure 5:
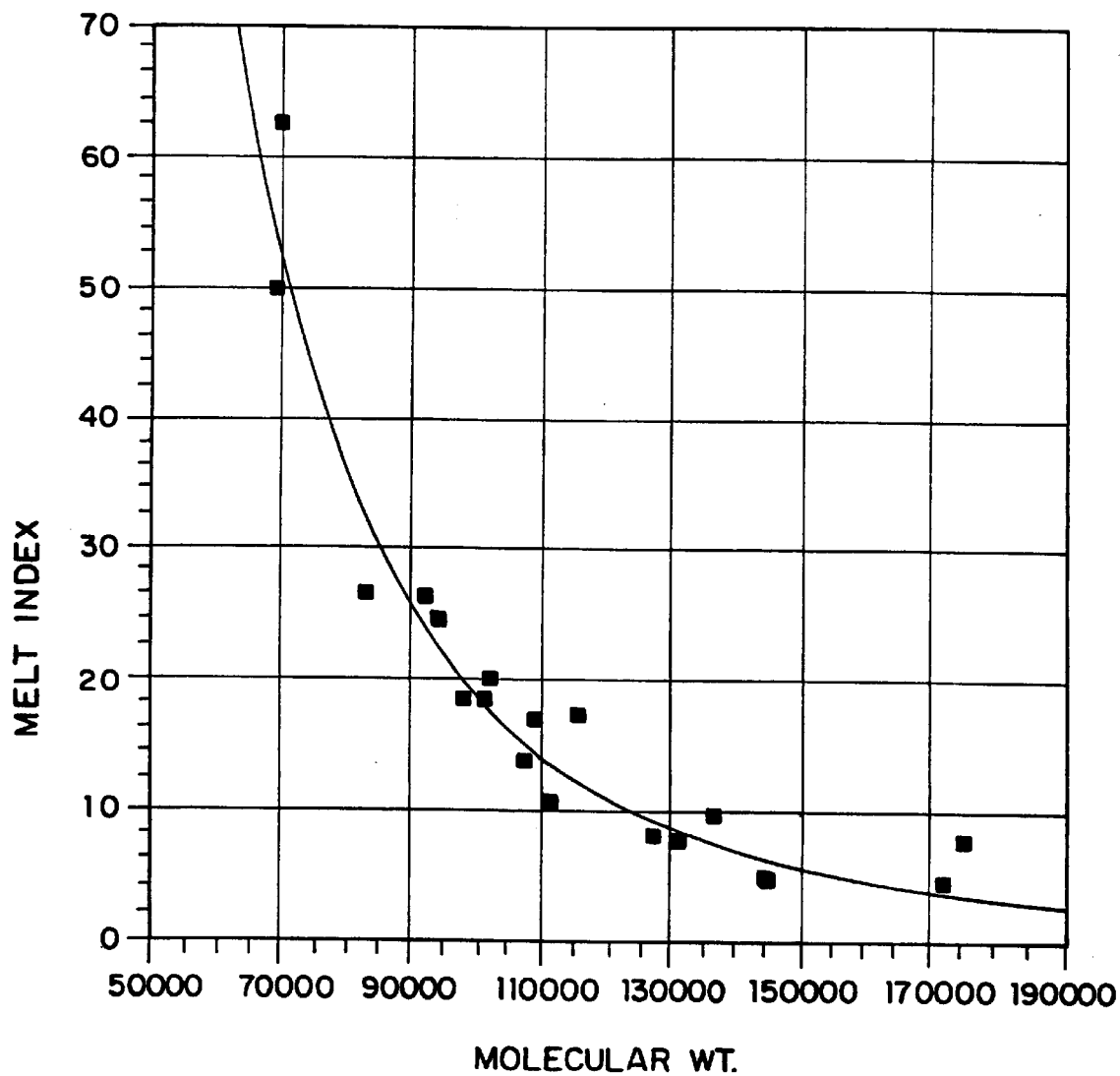
FIG. 5 is a graphical representation of the relationship of molecular weight and melt index for melt-spinnable elastomeric polymers in accordance with the present invention.

Weight average molecular weight (Mw) is inversely proportional to melt index (MI), which is inversely proportional to melt viscosity (MV). A standard ASTM method D1238 may be used to determine the molecular weights of elastomeric polymers, including those which represent preferred embodiments of the present invention. The tests may be conducted at a fixed temperature 200° C. with a 2.16 kilogram weight forcing molten polymer through a 2.09 millimeter orifice, as specified in the standard ASTM method. This relationship has been measured and is generally comparable to molecular weight data obtained using gel permeation chromatography. The results of tests of elastomeric polymers which are exemplary of elastomeric polymers of the present invention are depicted graphically in FIG. 5 which includes a plot of melt index versus molecular weight. Inspection of the graph in FIG. 5 reveals that for preferred polymers of the present invention, which preferably have a weight average molecular weight of from about 90,000 to about 150,000, the melt index may range from about 5 to about 25.

Viscosity

Figure 6:
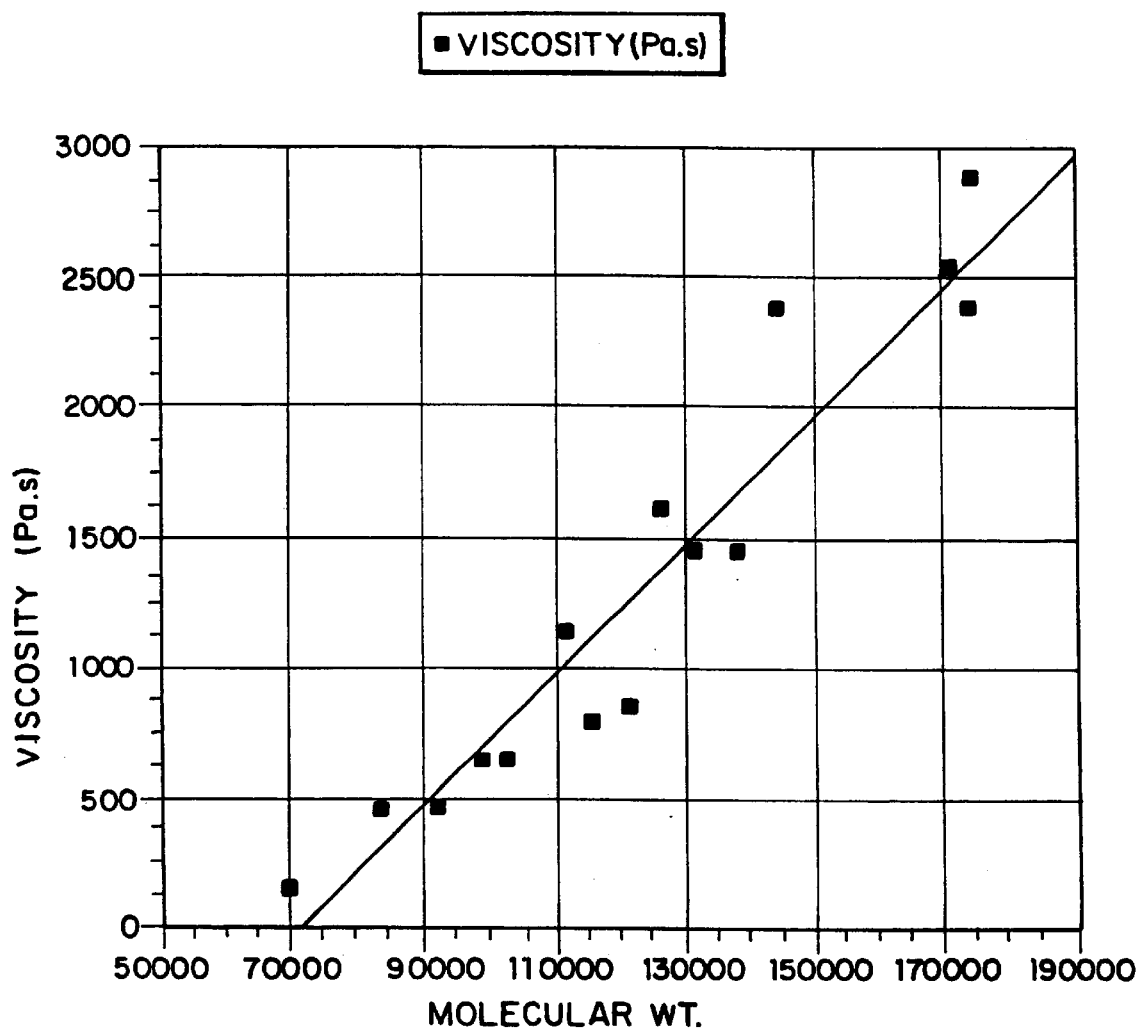
FIG. 6 is a graphical representation of the relationshup of molecular weight and viscosity for melt-spinnable elastomeric polymers in accordance with the present invention.

FIG. 6 includes a graphical depiction of the relationship of viscosity and weight average molecular weight at a shear stress of $1.94 \times 10^4$ Pa. As indicated in FIG. 6, this relationship is generally linear. Inspection of the graph in FIG. 6 reveals that, for preferred polymers of the present invention, which preferably have a weight average molecular weight of from about 90,000 to about 150,000, the viscosity may range from about 500 to about 2000 Pa·s.

Gel Permeation Chromatography

Figure 7:
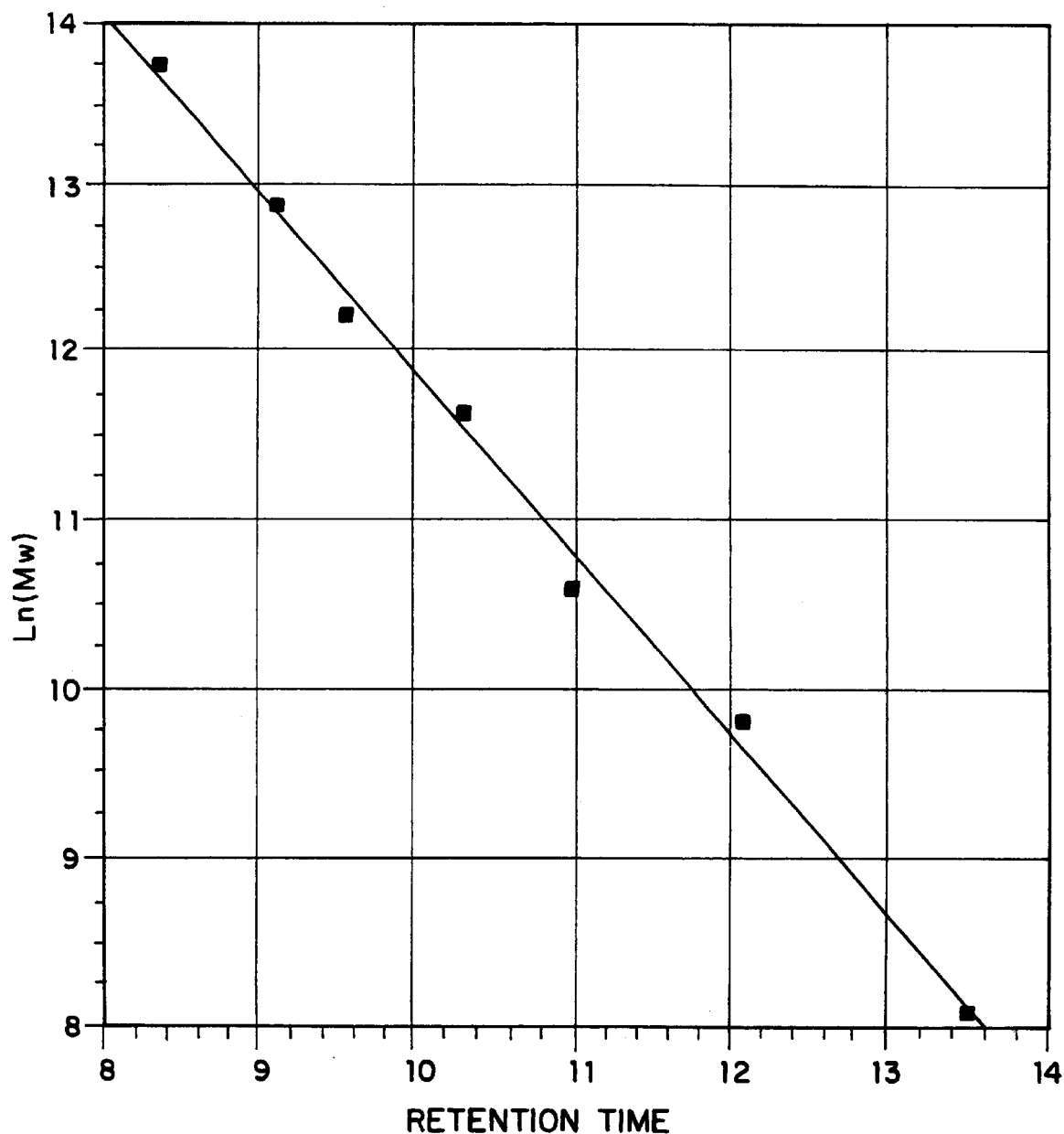
FIG. 7 is a graphical representation of the log of molecular weight versus retention time for a series of polystyrene standards used to calibrate equipment employed in GPC analyses in accordance wiffi an embodiment of the present invention.
Figure 8:
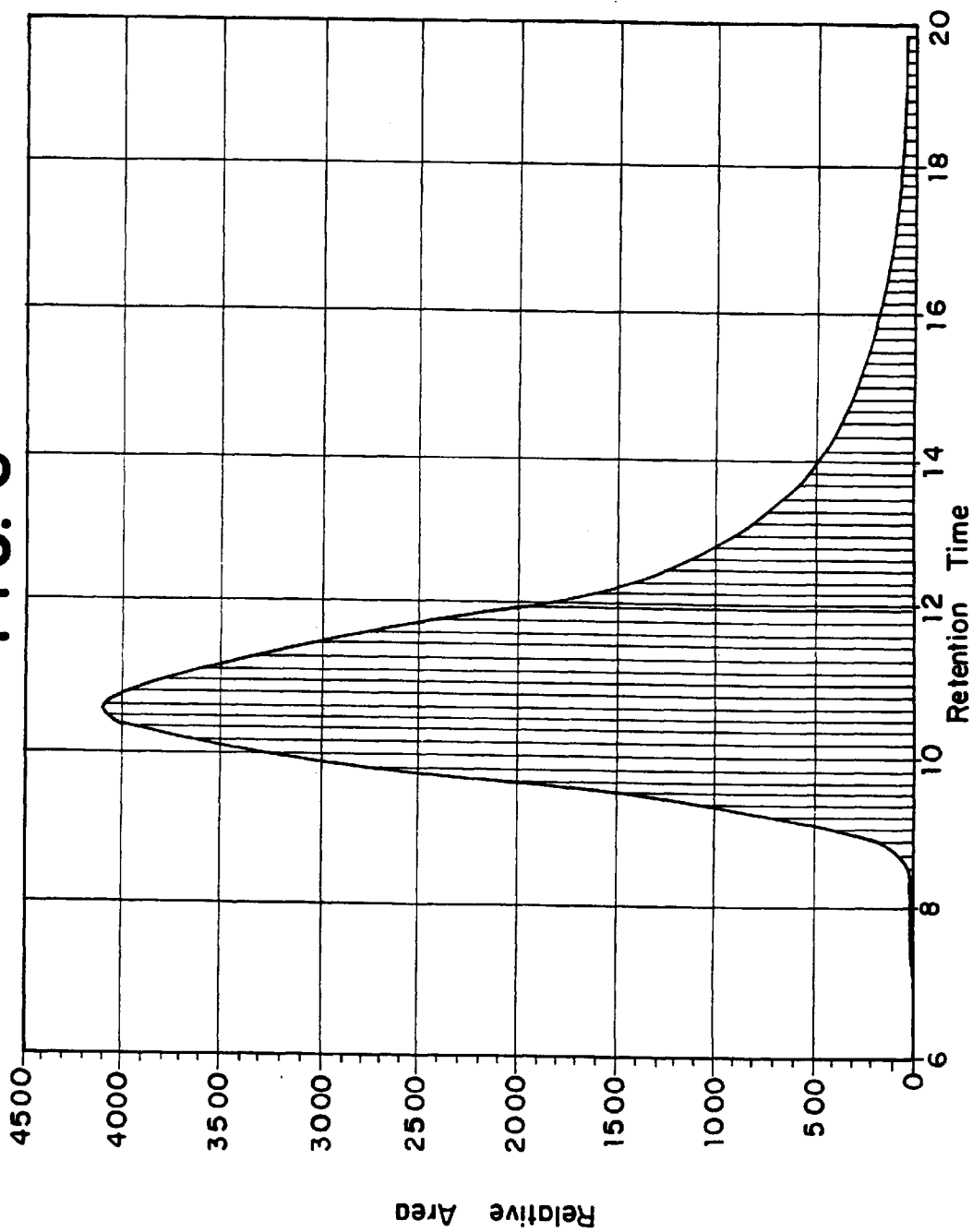
FIG. 8 is a GPC curve obtained with a melt-spinnable elastomeric polymer in accordance with the present invention.
Figure 9:
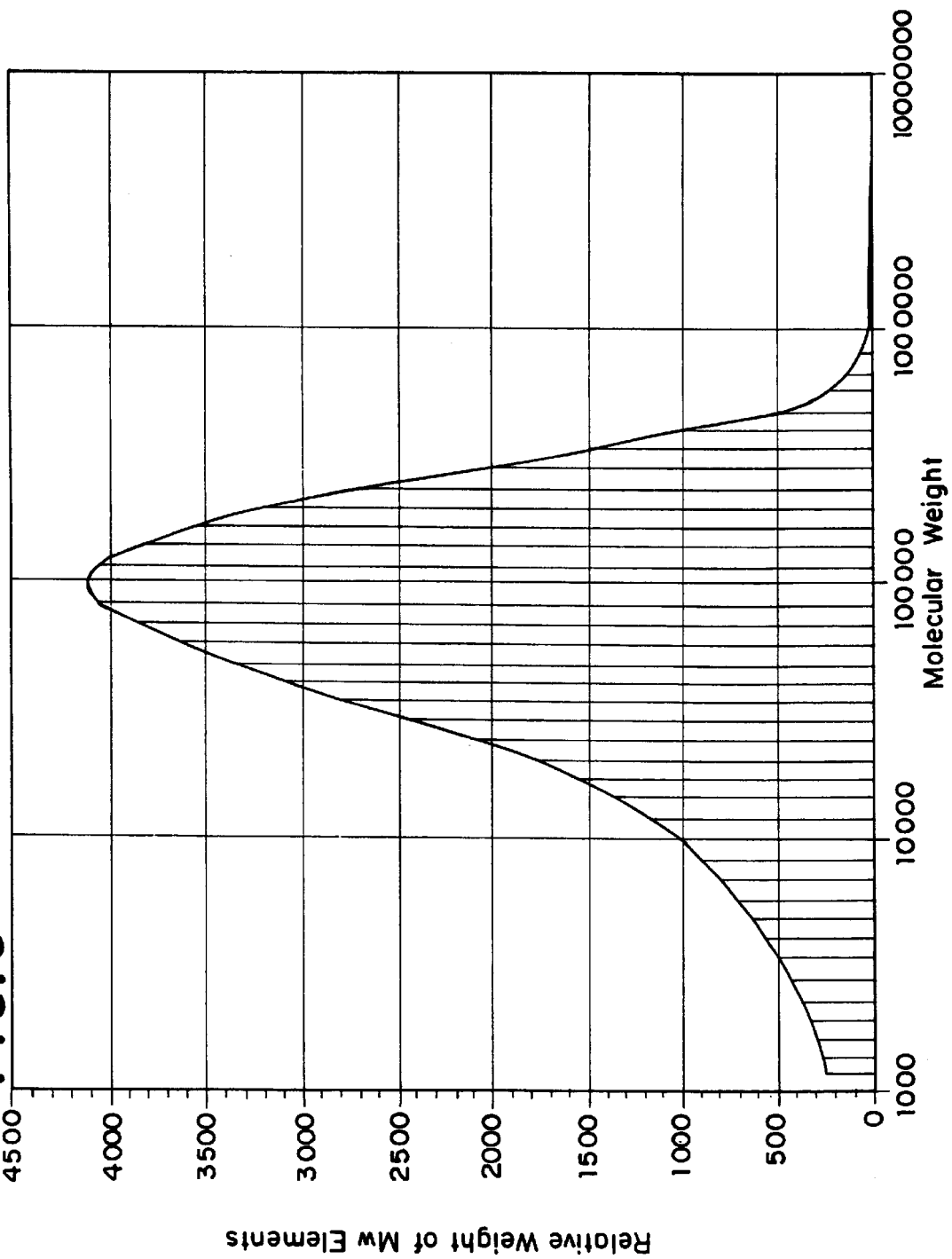
FIG. 9 is a graphical representation of the relative amount of material versus molecular weight for each component in the molecular weight distribution in FIG. 8.

Gel permeation chromatography (GPC) is a useful method for measuring molecular weight and molecular weight distributions of a polymer. FIG. 7 is a graphical representation of the log of molecular weights versus retention time for a series of polystyrene standards used to calibrate the equipment employed in GPC analyses (Styragel columns and dimethylformamide as solvent). FIG. 8 is a GPC curve obtained with an exemplary melt-spinnable elastomeric polymer of the present invention. Replotting the data exemplified in FIG. 8 to separate the relative amount of material versus molecular weight for each component in the molecular weight distribution provides the graph depicted in FIG. 9. A low molecular weight limit of 1350 was used for computation of number average molecular weight. Inspection of the distribution curve in FIG. 9 reveals that the involved polymer has a peak molecular weight of 100,000.

Differential Scanning Calorimetry

A Thermal Analyst 2000 differential scanning calorimeter (TA Instruments, New Castle, Del.) may be used to determine the thermal responses of the polymers of the present invention. The procedures generally involve equilibrating at 50° C. samples of polymer in the form of pellets or fibers. The samples may then be heated to 260° C. at a rate of about 20° C. per minute. Thermal characteristics of the polymers may be evaluated over the temperature range of 100° C. to 260° C. The data obtained include such characteristics as heat of transition and softening, melting and flow points.

Microscopy

Electron and optical microscopy may be used to evaluate the physical characteristics of polymers of the present invention and of the prior art. Hot stage microscopy may also be used to evaluate thermal properties of any impurities and other heterogenous phases which may be present in the polymers, as well as in determining phase composition.

Hydroxyl Number and Molecular Weight

Prior to being employed in methods for preparing the polymers described herein, hydroxyl numbers are preferably determined for the starting materials, including polyol, for example, PTMEG, and dihydroxy aromatic compound, for example, HQEE. Hydroxyl numbers may be determined using standard procedures which involve reacting weighed samples of polyol and/or dihydroxy aromatic compound with an acetylating agent under refluxing conditions. The reaction mixture may be cooled and titrated with standardized potassium hydroxide (KOH). The titration results may be compared to results obtained from a reagent blank. Based on this comparison, the hydroxyl number (expressed as milligrams (mg) of KOH per gram (g) of the sample) may be determined. Once armed with the hydroxyl number, the molecular weight of the particular starting material may be determined by dividing the molecular weight of KOH by the hydroxyl number and multiplying by 2000.

Amine Equivalent and Isocyanate Content

Amine equivalent and isocyanate content may be determined for the starting diisocyanate compound by reacting a weighed sample of the compound with an excess of dibutylamine in o-xylene, at room temperature. The unreacted dibutylamine may be titrated with a standardized hydrochloric acid solution. A reagent blank may also be prepared and titrated. The amine equivalent and the weight percent of isocyanate may be calculated form the difference between the volume of titrant required for the reagent blank and that required for the sample.

Karl Fischer Moisture Analysis

A Metrohm 737 coulometer may be used to determine the initial moisture content of samples of polyol and the effectiveness of a drying cycle which may be employed in preferred embodiments. About 1 g of liquid sample may be injected into the sealed titration cell through a septum. An accurate sample weight may be calculated by difference, having weighed the sample before and after injection. Commercially prepared, single-use water standards may be used to verify sample suitability each time the reagent is replenished.

EXAMPLES

The invention is further described in the following examples. All of the examples are actual examples. These examples are for illustrative purposes only, and are not to be construed as limiting the appended claims.

Examples 1 to 12 are directed to the preparation of prepolymers, polymers, monofilament fibers, multifilament yarns and/or wearable articles within the scope of the present invention. Example 13 is directed to the preparation of a polymer employing methods of the prior art. All of the examples are actual examples.

Example 1

This example includes a description of the preparation of 0.10 molar % branched (1.00:2.00:0.99) PTMEG-MDI- HQEE thermoplastic polyurethane, terminated with diethyleneglycol butyl ether, and employing DMDEE as catalyst. This example also includes a description of the preparation of monofilament fibers and wearable articles from this polymer.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater, was added poly(oxytetramethylene) lycol (PTMEG) (22,154.8 g, 10.76 moles) having a hydroxy number of 54.47 (2060 Mol. Wt.). The ratio of the actual to the theoretical amount of PTMEG added was determined and then used to calculate the required weights for the remainder of reagents. Trimethylolethane (TME) (1.29 g, 0.011 moles), as branching agent, and Ciba Geigy Antioxidant 1010 (148.6 g) were combined and added to the reactor, and the reaction mixture was mixed thoroughly to assure dispersion and dissolution of the TME and antioxidant in the reaction mixture.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or −20 inches of Hg. The reactor reached 125° C. within about 20 minutes from the start of evacuation. After 30 minutes of evacuation, the vacuum was discontinued and the reactor was allowed to repressurize to 1 atmosphere under nitrogen. Moisture measurements made before and during the drying cycle indicated ihe moisture content had dropped to less than 150 ppm well within the time allocated for this step.

When the reactor was repressurized, 4,4'-diphenylmethane diisocyanate (MDI) (5,386.9 g, 21.53 moles), as capping agent, was added with vigorous stirring. The oil heater was then reset to 175° C. Once the reactor temperature reached 150° C. (oil heater set at 175° C.), the reaction was allowed to continue for 20 minutes. A slight bleed of nitrogen was maintained so as to maintain a blanket of nitrogen over the reaction mixture. The oil heater temperature was then reset to 230° C. When the reactor temperature reached 210° C., dimorpholinodiethyl ether (DMDEE) (29.72 g), as catalyst, was added with vigorous stirring. Five minutes after addition of DMDEE, diethyleneglycol butyl ether (DEGBE) (41.9 g), as terminator, was added with vigorous stirring.

ii. Chain Extension of Prepolymer

Five minutes after the DEGBE addition, 90% of the calculated amount of 1,4-bis(β-hydroxyethoxy)benzene (HQEE) (1,918.5 g, 9.56 moles), as chain extender. was added to the reactor with vigorous sting. When the composition was thoroughly mixed, the stirrer speed was reduced. After an additional 7 minutes, the remaining 10% of HQEE (213.17 g, 1.06 moles) was added. Ten minutes after the final addition of HQEE, the reactor was slowly evacuated while stirring under a slight bleed of nitrogen. The oil heater temperature was reduced to 225° C. during this evacuation cycle. After evacuating for about 5 minutes, the reactor stirrer was stopped, the vacuum valve was closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product was allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ~⅛" long cylindrical pellets. The polymer had a melt index of 17.3 at 200° C. DSC data obtained using a DuPont Model 990 gave a melting point of 188° C., a recovery temperature of 200° C., and no melting component above 200° C.

GPC data was obtained giving a weight average molecular weight (Mw) of 105,771 and a number average molecular weight (Mn) of 24,425 to afford a polydispersity of 4.33.

B. Melt Spinning of Polymer

The polymer prepared in Step A was spun using a Wayne ¾ inch single screw melt extruder with zones 1, 2, and 3 set at 170° C., 185° C., and 190° C., respectively. A spinneret having a 0.059 inch diameter hole and set at 195° C. was used to extrude the polymer. The monofilament fiber was passed through a finish guide with Lurol 6013 and then over Godet rolls with the first roll speed set at 800 rpm and the second roll speed set at 950 rpm. A windup speed of 1100 rpm gave a monofilament fiber having 54.8 denier, a tenacity of 1.21 grams per denier (gpd) at 610% elongation and a secant modulus of 0.146 gpd at 100% elongation.

Example 2

This example includes a description of the preparation of (1.02:2.00:0.95) PTMEG-MDI-HQEE thermoplastic polyurethane, terminated with diethylene butyl ether, employing DMDEE as catalyst. This example also includes a description of the preparation of monofilament fibers and wearable articles from this polymer.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEG) (15211.6 g, 7.437 moles) having a hydroxy number of 54.85 (2,045.39 Mol. Wt.) The ratio of actual to theoretical amount of PTMEG added was determined and then used to calculate the required weights for the remainder of the reaction component.

Ciba Geigy Antioxidant 1010 (101.37 g) was added to the reactor and mixed thoroughly to disperse and dissolve in the polyol.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or −20 inches of Hg. The reactor reached 125° C. within about 20 minutes from the start of evacuation. After evacuating for 30 minutes, the vacuum was discontinued and the reactor was allowed to repressurize to 1 atmosphere under nitrogen. Moisture measurements made before and during the drying cycle indicated the moisture content had dropped to less than 150 ppm well within the time allocated for this step.

When the reactor was repressurized, 4,4'-diphenylmethane diisocyanate (MDI) (3649.4 g, 14.58 moles), as capping agent, was added with vigorous stirring. The oil heater was then reset to 175° C. The reaction was allowed to continue for 20 minutes from the time the reactor temperature reached 150° C. (oil heater set at 175° C.). A slight bleed of nitrogen was maintained to maintain a nitrogen blanket over the reaction mixture. The oil heater temperature was then reset to 230° C. When the reactor temperature reached 220° C., dimorpholinodiethyl ether (DMDEE) (20.3 g) as catalyst was added with vigorous stirring. Five minutes after adding the catalyst, diethyleneglycol butyl ether (DEGBE) (28.4 g), as chain terminator, was added with vigorous stiring.

ii. Chain Extension of Prepolymer

Five minutes after the DEGBE addition, 90% of calculated amount of 1,4-bis(β-hydroxyethoxy)benzene (HQEE) (1245.96 g, 6.22 moles), as chain extender, was added with vigorous stirring. When the composition was thoroughly mixed, the stirrer speed was reduced. After an additional 7 minutes, the remaining 10% of HQEE (138.44 g 0.691 moles) was added. After about 5 minutes evacuation, the reactor stirrer was stopped, the vacuum valve closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ~⅛" long cylindrical pellets. The polymer had a melt index of 6.6 at 200° C. DSC data obtained using a DuPont Model 990 gave a 189.95° C. melting point, a recovery temperature of 204° C. and no melting component above 200° C.

GPC data was obtained giving a weight average molecular weight (Mw) of 128,057 and a number average molecular weight (Mn) of 27,838 to afford a polydispersity of 4.60.

B. Melt Spinning of Polymer

The polymer prepared in Step A was spun using a Wayne ¾ inch single screw melt extruder with zones 1, 2, and 3 set at 180° C., 195° C., and 205° C., respectively. A spinneret having a 0.059 inch diameter hole and set at 210° C. was used to extrude the polymer. The monofilament fiber was passed through a finish guide with Lurol 6013 and then over Godet rolls with the first roll speed set at 684 rpm and the second roll speed set at 705 rpm. A windup speed of 950 rpm gave a monofilament fiber having 61.5 denier, a tenacity of 1.06 gpd at 710% elongation and a secant modulus of 0.081 gpd at 100% elongation.

The polymer was also spun using a Killian 1-¼ inch 8 end screw melt extruder at a commercial spinning plant with zones 1, 2, 3, and 4 set at 190° C., 203° C., 205° C., and 206° C. respectively. An 8 end spinneret having 0.059 inch diameter holes and set at 210° C. was used to extrude the polymer. The 8 end monofilament fibers were passed through a finish guide with Lurol 6847 and then over Godet rolls with the first roll speed set at 684 rpm and the second roll speed set at 705 rpm. A windup speed of 900 rpm gave a monofilament fiber having 70.5 denier. This monofilament fiber had a tenacity of 1.12 gpd at 568% elongation and a secant modulus of 0.099 gpd at 100% elongation.

C. Preparation of Wearable Articles

The monofilament fibers spun using the Wayne ¾ inch single screw melt extruder in Step B were knit into tubing and the results were judged equal to a Lycra® spandex control. The monofilament fibers spun using the Killian 1-¼ inch 8 end screw melt extruder in Step B were knitted on an Ultra 4 Zodiak knitting machine into a standard greige blank for one half of a women's pantyhose using the same settings and speeds established for 70 denier Lycra® spandex. They were wear tested versus dry spun Lycra® spandex control of 70 denier. The results were judged to be similar to the control in up to 10 days of wear.

Example 3

This example includes a description of the preparation of monofilament fibers and wearable articles from a blend of the polymers prepared in Examples 1 and 2.

A. Melt Spinning of Polymer

The thermoplastic polyurethane polymers from Example 1 and Example 2 were blended in a 50/50 weight ratio. GPC data was obtained for this blend giving a weight average molecular weight (Mw) of 110,829 and a number average molecular weight (Mn) of 24,986 to afford a polydispersity (Mw/Mn) of 4.44.

The above polymer blend was spun using a Wayne ¾ inch single screw melt extruder with zones 1, 2, and 3 set at 170° C., 190° C., and 198° C., respectively. A spinneret having a 0.059 inch diameter hole and set at 205° C. was used to extrude the polymer. The resulting monofilament fiber was passed through a finish guide with Lurol 6013 and then over Godet rolls with the first roll speed set at 675 rpm and the second roll speed set at 760 rpm. A windup speed of 1000 rpm gave a monofilament fiber having 58.5 denier, a tenacity of 1.15 gpd at 594% elongation and a secant modulus of 0.12 gpd at 100% elongation.

The blend of polymers prepared from Examples 1 and 2 was also spun using a Killian 1-¼ inch 8 end screw melt extruder at a commercial spinning plant with zones 1, 2, 3, and 4 set at 180° C., 190° C., 195° C., and 195° C., respectively. An 8 end spinneret having 0.059 inch diameter holes and set at 200° C. was used to extrude the polymer. The 8 end monofilament fibers were passed through a finish guide with Lurol 6847 and then over Godet rolls with the first roll speed set at 684 rpm and the second roll speed set at 705 rpm. A windup speed of 900 rpm gave a monofilament fiber having 70.5 denier, a tenacity of 1.08 gpd at 571% elongation and a secant modulus of 0.116 gpd at 100% elongation.

Spinneret temperatures of 195° C. and 205° C. gave the following results. The monofilament fiber at 195° C. had a tenacity of 1.12 gpd at 456% elongation and a secant modulus of 0.17 gpd at 100% elongation. At 205° C., the monofilament fiber had a tenacity of 1.08 gpd at 580% elongation and a secant modulus of 0.111 gpd at 100% elongation.

B. Preparation of Wearable Articles

The monofilament fibers obtained in Step A were knitted on an Ultra 4 Zodiak knitting machine into a standard greige blank for one half of a women's pantyhose using the same settings and speeds established for 70 denier Lycra® spandex. They were wear tested versus 70 denier dry spun Lycra® spandex control. The results were judged to be equal to the control in up to 12 days of wear.

Example 4

This example includes a description of the preparation of 0.10 molar % branched (1.05:2.00:0.95) PTMEG-MDI-HQEE thermoplastic polyurethane employing DMDEE as catalyst. This example also includes a description of the preparation of monofilament fibers from this polymer.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEG) (19292.0 g, 9.43 moles) having a hydroxy number of 54.85 (2045.39 Mol. Wt.). The ratio of actual to theoretical amount of PTMEG added was determined and then used to calculate the required weights for the remainder of the reaction components. Trimethylolethane (TME) (1.069 g, 0.009 moles), as branching agent, and Ciba Geigy Antioxidant 1010 (127.2 g) were then combined and added to the reactor. The reaction mixture was mixed thoroughly to disperse and dissolve the trimethylolethane and antioxidant in the polyol.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or −20 inches of Hg. The reactor reached 125° C. within about 20 minutes from the start of evacuation. After evacuating for 30 minutes, the vacuum was discontinued and the reactor was allowed to repressurize to 1 atmosphere under nitrogen. Moisture measurements made before and during the drying cycle indicated the moisture content had dropped to less than 150 ppm well within the time allocated for this step. When the reactor was repressurized, 4,4'-diphenylmethane diisocyanate (MDI) (4453.5 g, 17.8 moles), as capping agent, was added with vigorous stirring. The oil heater was then reset to 175° C. The reaction was allowed to continue for 20 minutes from the time the reactor temperature reached 150° C. (oil heater set at 175° C.). A slight bleed of nitrogen was maintained to maintain a nitrogen blanket over the reaction mixture. The oil heater temperature was then reset to 230° C. When the reactor temperature reached 210° C., dimorpholinodiethyl ether catalyst (DMDEE) (25.4 g) was added with vigoroius stirring.

ii. Chain Extension of Prepolymer

Ten minutes after the DMDEE addition, 90% of the calculated amount of 1,4-bis(β-hydroxyethoxy)benzene (HQEE) (1521.18 g, 7.58 moles), as chain extender, was added with vigorous stirring. When the composition was thoroughly mixed, the stirrer speed was reduced. After an additional 7 minutes of stirring, the remaining 10% of HQEE (169.0 g, 0.84 moles) was added. Ten minutes after the final addition of HQEE, the reactor was slowly evacuated while stirring under a slight bleed of nitrogen. The oil heater temperature was reduced to 225° C. during the evacuation cycle. After evacuating for about 5 minutes, the reactor stirrer was stopped, the vacuum valve was closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ~⅛" long cylindrical pellets. The polymer had a melt index of 9.3 at 200° C. DSC data obtained using a DuPont Model 990 gave a melting point of 182° C., a recovery temperature of 200° C. and no melting component above 200° C.

GPC data was obtained giving a weight average molecular weight (Mw) of 122,740 and a number average molecular weight (Mn) of 27,239 to afford a polydispersity. (Mw/Mn) of 4.51.

B. Melt Spinning of Polymer

The polymer prepared in Step A was spun using a Wayne ¾ inch single screw melt extruder with zones 1, 2, and 3 set at 170° C., 195° C., and 200° C., respectively. A spinneret having a 0.059 inch diameter hole and set at 205° C. was used to extrude the polymer. The monofilament fiber was passed through a finish guide with Lurol 6013 and then over Godet rolls with the first roll speed set at 675 rpm and the second roll speed set at 760 rpm. A windup speed of 1000 rpm gave a monofilament having 55.7 denier, a tenacity of 1.36 gpd at 610% elongation and a secant modulus of 0.106 gpd at 100% elongation.

Example 5

This example includes a description of the preparation of 0.10 molar % branched (1.00:2.00:1.00) PTMEG-MDI-HQEE thermoplastic polyurethane employing, DMDEE as catalyst. This example also includes a description of the preparation of monofilament fibers from this polymer.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEG) (25,618 g, 12.99 moles) having a hydroxyl number of 56.9 (1972.06 Mol. Wt.). The ratio of actual to theoretical amount of PTMEG added was determined and then used to calculate the required weights for the remainder of reagents. Trimethylolethane (TME) (1.56 g, 0.013 moles), as branching agent, and Ciba Geigy Antioxidant 1010 (173.6 g) were combined and added to the reactor. The reaction mixture was mixed thoroughly to disperse and dissolve the TME and antioxidant in the polyol.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or −20 inches of Hg. The reactor reached 125° C. within about 20 minutes from the start of evacuation. After evacuating for minutes, the vacuum was discontinued and the reactor was allowed to repressurize to 1 atmosphere under nitrogen. Moisture measurements made before and during the drying cycle indicated the moisture content had dropped to less than 150 ppm well within the time allocated for this step. When the reactor was repressurized, 4,4'-diphenylmethane diisocyanate (MDI) (6506.9 g, 26.0 moles), as capping agent, was added to the reactor with vigorous stirring. The oil heater was then reset to 175° C.

The reaction was allowed to continue for 20 minutes from the time the reactor temperature reached 150° C. (oil heater set at 175° C.). A slight bleed of nitrogen was maintained, enough to keep a nitrogen blanket over the reaction mixture. The oil heater temperature was then reset to 235° C. When the reactor temperature reached 200° C. dinorpholinodiethyl ether catalyst (DMDEE) (34.73 g) was added with vigorous stirring.

ii. Chain Extension of Prepolymer

Ten minutes after the DMDEE addition, the calculated theoretical amount of 1,4-bis(β-hydroxyethoxy)benzene (HQEE) (2605.0 g, 12.98 moles), as chain extender, was added with vigorous stirring. When the composition was thoroughly mixed, the stirrer speed was reduced. Ten minutes after the addition of HQEE, the reactor was slowly evacuated while stirring under a slight bleed of nitrogen. The oil heater temperature was reduced to 225° C. during the evacuation cycle. After about 5 minutes evacuation, the reactor stirrer was stopped, the vacuum valve was closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product was allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ~⅛" long cylindrical pellets. The polymer had a melt index of 4.4 at 200° C. DSC data obtained using a DuPont Model 990 gave a melting point of 190° C., a recovery temperature of 205° C. and no melting component above 200° C.

GPC data was obtained giving a weight average molecular weight (Mw) of 135,025 and a number average molecular weight (Mn) of 28,959 to afford a polydispersity (Mw/Mn) of 4.66.

B. Melt Spinning of Polymer

The polymer was spun using a Wayne ¾ inch single screw melt extruder with zones 1, 2, and 3 set at 170° C., 195° C., and 200° C., respectively. A spinneret having a 0.052 inch diameter hole and set at 205° C. was used to extrude the polymer. The monofilament fiber was passed through a finish guide with Lurol 6013 and then over Godet rolls with the first roll speed set at 720 rpm and the second roll speed set at 730 rpm. A windup speed of 750 rpm gave a monofilament fiber having 56.1 denier. a tenacity of 1.61 gpd at 550% elongation and a secant modulus of 0.271 gpd at 100% elongation.

Example 6

This example includes a description of the preparation of 0.50 molar % branched (1.00:2.01:1.00) PTMEG-MDI-HQEE thermoplastic polyurethane employing DMDEE as catalyst. This example also includes a description of the preparation of monofilament fibers from this polymeric material.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEG) (22,783.0 g, 11.34 moles) having a hydroxyl number of 55.85 (2,009 Mol. Wt.) The ratio of actual to theoretical amount of PTMEG added was determined and then used to calculate the required weights for the remainder of the reaction components. Trimethylolethane (TME) (6.813 g, 0.057 moles), as branching agent, and Ciba Geigy Antioxidant 1010 (153.8 g) were combined and added to the reactor. The reaction mixture was mixed thoroughly to disperse and dissolve the TME and antioxidant in the polyol.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or –20 inches of Hg. The reactor reached 125° C. within about 20 minutes from the start of evacuation. After evacuating for 60 minutes, the vacuum was discontinued and the reactor was allowed to repressurize to 1 atmosphere under nitrogen. Moisture measurements made before and during the drying cycle indicated that the moisture content had dropped to less than 150 ppm well within the time allocated for this step. When the reactor was repressurized, 4,4'-diphenylmethane diisocyanate (MDI) (5697.0 g, 22.76 moles), as capping agent, was added with vigorous stirring.

ii Chain Extension of Prepolymer

After addition of the MDI, the oil heater was reset to 165° C. The reaction was allowed to continue for 20 minutes from the time the reactor temperature reached 150° C. (oil heater set at 165° C.). A slight bleed of nitrogen was maintained to maintain a nitrogen blanket over the reaction mixture. The oil heater temperature was then reset to 225° C. When the reactor temperature reached 205° C., HQEE (2273.98 g, 11.33 moles) was added with vigorous stirring. Immediately after adding the HQEE, DMDEE (30.76 g) catalyst was added.

After 10 minutes, the reactor was slowly evacuated while stirring was continued and while a very slight bleed of nitrogen was passed into the system. After evacuating for about 10 minutes, the reactor stirrer was stopped, the vacuum valve was closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product was allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ~⅛" long cylindrical pellets. The polymer had a melt index of 9.3 at 200° C. DSC data obtained using a DuPont Model 990 gave a melting point of 188° C., a recovery temperature of 200° C. and no melting component above 200° C.

GPC data was obtained giving a weight average molecular weight (Mw) of 123,004 and a number average molecular weight (Mn) of 26,714 to afford a polydispersity Mw/Mn of 4.60.

B. Melt Spinning of Polymer

The polymer prepared in Step A was spun using a Wayne ¾ inch single screw melt extruder with zones 1, 2, and 3 set at 170° C., 185° C., and 190° C., respectively. A spinneret having a 0.059 inch diameter hole and set at 202° C. was used to extrude the polymer. The monofilament fiber was passed through a finish guide with Lurol 6013 and then over Godet rolls with the first roll speed set at 720 rpm and the second roll speed set at 730 rpm. A windup speed of 750 rpm gave a monofilament fiber having 69.0 denier, a tenacity of 1.08 gpd at 602% elongation and a secant modulus of 0.167 gpd at 100% elongation.

Example 7

This example includes a description of the preparation of 0.10 molar % branched (1.00:2.00:1.00) PTMEG-MDI-HQEE thermoplastic polyurethane employing DMDEE as catalyst. This example also includes a description of the preparation of monofilament fibers from this polymer.

A. Preparation of Polymer i. Preparation of Prepolymer

Into a 10 gallon 10CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEG) (14,002.3 g, 6.87 moles) having a hydroxyl number of 55.07 (2037.59 Mol. Wt.). The ratio of actual to theoretical amount of PTMEG added was determined arid then used to calculate the required weights for the remainder of reagents. Trimethylolethane (TME) (0.826 g, 0.0069 moles), as branching agent, and Ciba Geigy Antioxidant 1010 (94.3 g) were combined and added to the reactor. The reaction mixture was mixed thoroughly to disperse and dissolve the TME and antioxidant in the polyol.

The oil heater was set to 135° C. and a mild nitrogen flush through the reactor was started. When the reactor temperature reached 100° C., the vacuum drying cycle was started. A nitrogen bleed was adjusted to prevent foaming and to stabilize the vacuum at about 2000 micron pressure or –20 inches of Hg. The reactor reached 125° C. within about 20 minutes from the start of evacuation. After evacuating for 30 minutes. the vacuum was discontinued and the reactor was allowed to repressurize to 1 atmosphere under nitrogen. Moisture measurements made before and during the drying cycle indicated that the moisture content had dropped to less than 150 ppm well within the time allocated for this step.

When the reactor was repressurized, 4,4'-diphenylmethane diisocyanate (MDI) (3,442.2 g, 13.75 moles), as capping agent, was added with vigorous stirring. The oil heater was then reset to 175° C. The reaction was allowed to continue for 20 minutes from the time the reactor temperature reached 150° C. (oil heater set at 175° C.). A slight bleed of nitrogen was maintained to maintain a nitrogen blanket over the reaction mixture. The oil heater temperature was then reset to 230° C. When the reactor temperature reached 215° C., dimorpholinodiethyl ether (DMDEE) (18.85 g) as catalyst was added with vigorous stirring. Five minutes after adding the DMDEE catalyst, diethyleneglycol butyl ether (DEGBE) (30.1 g) was added with vigorous stirring.

ii. Chain Extension of Prepolymer

Five minutes after the DEGBE addition, the total calculated amount of 1,4-bis(β-hydroxyethoxy)benzene (HQEE) (1,378.1 g, 6.87 moles), as chain extender, was added with vigorous stirring. When the composition was thoroughly mixed, the stirrer speed was reduced. Ten minutes after the addition of HQEE, the reactor was slowly evacuated while stirring under a slight bleed of nitrogen. The oil heater temperature was reduced to 225° C. during the evacuation cycle. After about 5 minutes evacuation, the reactor stirrer was stopped, the vacuum valve was closed, and the reactor was allowed to return to atmospheric pressure under the nitrogen bleed.

The reactor was discharged by opening the slide valve to a triple hole position with the mixer stopped and a blanket of nitrogen maintained inside the reactor. The strands of polymer were deposited onto a conveyer set about 8 inches below the discharge port and the product was allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

GPC data was obtained giving a weight average molecular weight (Mw) of 93,688 and a number average molecular weight (Mn) of 21,759 to afford a polydispersity (Mw/Mn) of 4.31.

The strands were then pelletized using a Conair/JETRO Pelletizer to obtain ~⅛" long cylindrical pellets. The polymer had a melt index of 24.4 at 200° C. DSC data obtained using a DuPont Model 990 gave a melting point of 186° C., a recovery temperature of 210° C. and no melting component above 200° C.

B. Melt Spinning of Polymer

The polymer was spun using a Wayne ¾ inch single screw melt extruder with zones 1, 2, and 3 set at 170° C., 185° C., and 195° C., respectively. A spinneret having a 0.059 inch diameter hole and set at 205° C. was used to extrude the polymer. The monofilament fiber was passed through a finish guide with Lurol 6013 and then over Godet rolls with the first roll speed set at 500 rpm and the second roll speed set at 700 rpm. A windup speed of 900 rpm gave a monofilament fiber having 52.1 denier. This monofilament fiber had a tenacity of 1.04 gpd at 558% elongation and a secant modulus of 0.134 gpd at 100% elongation.

Example 8

This example includes a description of the preparation of (1.00:2.00:1.00) PTMEG-MDI-HQEE thermoplastic polyurethane elastomer, employing DMDEE as catalyst. This example also includes a description of the preparation of a multifilament yarn from this polymeric material.

A. Preparation of Polymer i. Preparation of Prepolymer

Into a 8 liter 8CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (PTMEEG) (2,359.9 g, 1.19 moles) having a hydroxyl number of 56.59 (1,982.51 Mol. Wt.). The ratio of actual to theoretical amount of PTMEG added was determined and then used to calculate the required weights for the remainder of the reaction components. Ciba Geigy Antioxidant 1010 (27.709 g) was added to the reactor and the reaction mixture was stirred vigorously to dissipate and dissolve the antioxidant. The oil heater was set to 165° C. and a mild nitrogen flush through the reactor was started. When the reactor temperature reached 125° C., the mixer was started and evacuated under a mild nitrogen flow to remove moisture. The vacuum was continued with the nitrogen flush until the reactor reached 156° C. This took about 10 minutes from the start of evacuation. After evacuating for 20 minutes, the vacuum valve was closed and the reactor was allowed to repressurize to 1 atm under nitrogen. When the reactor was repressurized, 4,4'-diphenylmethane diisocyanate (MDI) (595.799 g, 2.38 moles), as capping agent, was added with vigorous stirring.

ii. Chain Extension of Prepolymer

After addition of MDI, the reaction mixture was mixed for 15 minutes with the oil heater set at 165° C. and using a very slight bleed of nitrogen into the reactor. The oil heater was then reset to 215° C. and when the reactor temperature reached about 200–205° C., the calculated amount of 1,4-bis($\beta$-hydroxyethoxy)benzene (HQEE) (238.672 g, 1.19 moles), as chain extender, was added with vigorous stirring. Immediately after adding the HQEE, 5.542 g DMDEE catalyst was added. The mixer speed was then slowed after 1 minute.

Ten minutes after adding the catalyst, the reactor was evacuated while continuing to stir and while allowing a slight bleed of nitrogen to pass into the system. After five minutes evacuation under the nitrogen bleed, the reactor stirrer was stopped, the vacuum valve shut and the reactor allowed to return to atmospheric pressure under nitrogen. The reactor was discharged by opening the slide valve to a ½ inch hole position with the mixer stopped and a blanket of nitrogen maintained inside the reactor. The strands of polymer were deposited onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drurms. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ⅛" long cylindrical pellets. DSC data obtained using a DuPont Model 990 gave a melting point of 190° C., a recovery temperature of 202° C. and no melting component above 200° C.

GPC data was obtained giving a weight average molecular weight (Mw) of 103,682 and a number average molecular weight (Mn) of 22,805 to afford a polydispersity (Mw/Mn) of 4.55.

B. Melt Spinning of Polymer

The polymer was spun using a Wayne ¾ inch single screw melt extruder with zones 1, 2, and 3 set at 100° C., 180° C., and 190° C., respectively. A spinneret having a 4 hole spinneret each having a 0.026 inch diameter hole and set at 200° C. was used to extrude the polymer. The four filament yarn was passed through a finish guide with Lurol 6013 and then over Godet rolls with the first roll speed set at 720 rpm and the second roll speed set at 740 rpm. A windup speed of 750 rpm afforded a yarn having 75.5 denier, a tenacity of 0.99 gpd at 507% elongation and a secant modulus of 0.106 gpd at 100% elongation.

Example 9

This example includes a description of the preparation of (1.00:2.00:1.00) PTMEG-MDI-HQEE thermoplastic polyurethane. This example also includes a description of the preparation of multifilament yarns and wearable articles from this polymer.

A. Preparation of Polymer i. Preparation of Prepolymer

Into a 4 liter 4CV Helicone reactor (Design Integrated Technologies), outfitted with a sight glass, sample addition ports and vacuum and nitrogen ports, and heated by hot oil using a 14 KW Sterlco hot oil heater was added poly(oxytetramethylene) glycol (1,969.75 g, 0.985 moles) having a hydroxyl number of 56.105 (2,000 Mol. Wt.). The ratio of actual to theoretical amount of PTMEG added was determined and then used to calculate the required weights for the remainder of reagents. When the reactor was repressurized, 4,4'-diphenylmethane diisocyanate (MDI) (489.34 g, 1.96 moles), as capping agent, was added with vigorous stirring.

ii. Chain Extension of Prepolymer

After addition of MDI, the oil heater was reset to 165° C. The reaction was allowed to continue for 20 minutes from the time the reactor temperature reached 150° C. (oil heater set at 165° C.). A slight bleed of nitrogen was maintained to maintaina blanket of nitrogen over the reaction mixture. The oil heater temperature was then reset to 225° C. When the reactor temperature reached about 208–210° C., the calculated amount of 1,4-bis($\beta$-hydroxyethoxy)benzene (HQEE) (198.97 g, 0.99 moles), as chain extender. and Ciba Geigy Antioxidant 1010 (12.5 g) were combined, and added to the reactor. The reaction mixture was mixed thoroughly to disperse and dissolve the HQEE and antioxidant in the polyol.

The reaction proceeded for about 15 minutes before stranding. The reactor was discharged by opening the slide valve to a triple hole position with the mixer stopped and a blanket of nitrogen maintained inside the reactor. The strands of polymer were deposited onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a 2" Yellow Jacket Wayne Pelletizer to obtain ~⅛" long cylindrical pellets. The polymer had a melt index of 11.9 at 210° C. DSC data obtained using a DuPont Model 990 gave a melting point of 189° C., a recovery temperature of 203° C. and no melting component above 200° C.

GPC data was obtained giving a weight average molecular weight (Mw) of 126,089 and a number average molecular weight (Mn) of 27,384 to afford a polydispersity (Mw/Mn) of 4.60.

B. Melt Spinning of Polymer

The polymer obtained in Step A was spun using a Wayne ¾ inch single screw melt extruder with zones 1, 2, and 3 set at 100° C., 180° C., and 195° C., respectively. A spinneret having a 4 hole spinneret each having a 0.026 inch diameter hole and set at 205° C. was used to extrude the polymer. The four filament yarn was passed through a finish guide Lurol 6013 and then over Godet with the first roll speed set at 250 rpm and the second roll speed set at 750 rpm. A windup speed of 700 rpm gave a yarn having 68.2 denier, a tenacity of 0.81 gpd at 365% elongation and a secant modulus of 0.147 gpd at 100% elongation.

C. Preparation of Wearable Article

The yarn obtained in Step B was knitted on an Ultra 4 Zodiak knitting machine into a standard greige blank for one half of a women's pantyhose using the same settings and speeds established for 70 denier Lycra® spandex. The greige knit gave similar results to the Lycra control after standard steam autoclaving in that the panty sections were the same in all significant dimensions, including width, length and the like. Further measurements of the force exerted versus cross-stretch were also comparable to the Lycra® control. Wear tests demonstrated that the only difference noted by wearers was that 20% of them preferred the panty of the invention over the Lycra® controls, while 80% could not discern any difference. The only measurable difference noted during wear was that the panty of the invention did not stretch significantly in the lengthwise direction, while the panties of the prior art fibers all stretched from 14% to 45% in that direction. This stretch causes a pull downward in the panties of the prior art which may be sensed by some wearers, and may also be the cause of the gradual sliding down of pantyhose which is so uncomfortable to wearers.

Example 10

This example includes a description of the preparation of(1.00:2.00:1.00) poly(ethylene/butylene)adipate diol-MDI-HQEE thermoplastic elastomer, employing DMDEE catalyst. No branching agent or terminator was employed.

A. Preparation of Polymer i. Preparation of Prepolymer

Into a 8 liter 8CV Helicone reactor (Design Integrated Technologies), outfitted with a sight glass, sample addition ports and vacuum and nitrogen ports, and heated by hot oil using a 14 KW Sterlco hot oil heater was added (RUCO S-1040P; Ruco Polymer Corp., Hicksville, N.Y.) (3,698.8 g, 1.82 moles) having a hydroxy number of 55.20 (2,032.79 Mol. Wt.). The ratio of actual to theoretical amount of RUCO S-1040P added was determined and then used to calculate the required weights for the remainder of reagents.

Ciba Geigy Antioxidant 1010 (24.691 g) was added to the reactor and the reaction mixture was stirred vigorously to dissipate and dissolve the antioxidant. The oil heater was set to 165° C. and a mild nitrogen flush through the reactor was started. When the reactor temperature reached 125° C., the mixer was started and evacuated under a mild nitrogen flow to remove moisture. the vacuum was continued with the nitrogen flush until the reactor reached 156° C. This took about 10 minutes from the start of evacuation. After evacuating for 20 minutes, the vacuum valve was closed and the reactor was allowed to repressurize to 1 atm under nitrogen. When the reactor was repressurized, 4,4'-diphenylmethane diisocyanate (MDI) (910.73 g, 3.64 moles), as capping reagent, was added with vigorous sting.

ii Chain Extension of Prepolymer

After mixing for 15 minutes mixing (oil heater set at 165° C.) and using a very slight bleed of nitrogen, the oil heater was then reset to 215° C. When the reactor temperature reached about 200–205° C., the calculated amount of 1,4-bis(β-hydroxyethoxy)benzene (HQEE) (364.83 g, 1.82 moles), as chain extender, was added with vigorous stirring. Immediately after adding the HQEE, DMDEE catalyst (4.974 g) was added to the reactor, and the mixer speed was then slowed after 1 minute.

Ten minutes after adding the catalyst, the reactor was evacuated with continued stirring and while allowing a slight bleed of nitrogen to pass into the system. After evacuating for five minutes under the nitrogen bleed, the reactor stirrer was stopped, the vacuum valve was closed and the reactor was allowed to return to atmospheric pressure under nitrogen.

The reactor was discharged by opening the slide valve to a ½ inch hole position with the mixer stopped and a blanket of nitrogen maintained inside the reactor. The strands of polymer were dropped onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ⅛" long cylindrical pellets. The polymer had a melt index of 24.0 at 210° C. which corresponds to 10.0 at 200° C. DSC data obtained using a DuPont Model 990 gave a melting point of 170° C., a recovery temperature of 183° C. and no melting component above 200° C.

GPC data was obtained giving a weight average molecular weight (Mw) of 137,970 and a number average molecular weight (Mn) of 28,952 to afford a polydispersity (Mw/Mn) of 4.77.

B. Melt Spinning of Polymer and Preparation of Wearable Articles

The polymer from Step A was spun using a Wayne ¾ inch single screw melt extruder with zones 1, 2, and 3 set at 100° C., 180° C., and 190° C., respectively. A spinneret having a 4 hole spinneret each having 0.026 inch diameter holes and set at 187° C. was used to extrude the polymer. The four filament yarn was passed through a finish guide with Lurol 6013 and then over Godet rolls with the first roll speed set at 150 rpm and the second roll speed set at 600 rpm. A windup speed of 550 rpm gave a yarn having 70.7 denier, a tenacity of 0.88 gpd at 402% elongation and a secant modulus of 0.116 gpd at 100% elongation.

The yarn was knitted into tubing and gave similar results as compared to a Lycra® spandex control.

Example 11

This example includes a description of the preparation of (1.00:2.00:1.00) polyethylene adipate diol-MDI-HQEE thermoplastic elastomer, employing DMDEE as catalyst. No branching agent or terminator was employed.

A. Preparation of Polymer i. Preparation of Prepolymer

Into a 8 liter 8CV Helicone reactor (Design Integrated Technologies), outfitted with a sight glass, sample addition ports and vacuum and nitrogen ports, and heated by hot oil using a 14 KW Sterlco hot oil heater was added polyethylene adipate glycol (Piothane 2000 EA; Pioneer Chemical Co.) (3,261.0 g, 1.69 moles) having a hydroxy number of 58.1 (1,931.33 Mol. Wt.). The ratio of actual to theoretical amount of Piothane 2000 EA added was determined and then used to calculate the required weights for the remainder of reagents.

Ciba Geigy Antioxidant 1010 (22.22 g) was added to the reactor and the reaction mixture was stirred vigorously to dissipate and dissolve the antioxidant. The oil heater was set to 165° C. and a mild nitrogen flush through the reactor was started. When the reactor temperature reached 125° C., the mixer was started and evacuated under a mild nitrogen flow to remove moisture. The vacuum was continued with the nitrogen flush until the reactor reached 156° C. (about 10 minutes from the start of evacuation). After evacuating for 20 minutes, the vacuum valve was closed and the reactor was allowed to repressurize to 1 atm under nitrogen. When the reactor was repressurized, 4,4'-iphenylmethane diisocyanate (MDI) (845.1 g, 3.377 moles), as capping reagent, was added with vigorous stirring.

ii. Chain Extension of Prepolymer

After addition of the MDI, the reaction mixture was mixed for 15 minutes with the oil heater set at 165° C. and using a very slight bleed of nitrogen. The oil heater was then reset to 215° C. When the reactor temperature reached about 200–205° C., the calculated amount of 1,4-bis($\beta$-hydroxyethoxy)benzene (HQEE) (338.56 g, 1.689 moles), as chain extender, was added with vigorous stirring. Immediately after adding the HQEE, DMDEE catalyst (4.445 g) was added and the mixer speed was then slowed after 1 minute.

Ten minutes after adding the catalyst the reactor was evacuated with continued stirring and while allowing a slight bleed of nitrogen to pass into the system. After evacuating for five minutes under the nitrogen bleed, the reactor stirrer was stopped, the vacuum valve was closed and the reactor was allowed to return to atmospheric pressure under nitrogen.

The reactor was discharged by opening the slide valve to a ½ inch hole position with the mixer stopped and a blanket of nitrogen maintained inside the reactor. The strands of polymer were dropped onto a conveyer set about 8 inches below the discharge port and the product allowed to neck down as it was drawn down the belt. A stream of ice water on the belt provided initial cooling of the strands. The strands were then passed through an ice water bath, over a second conveyer and finally collected in drums. The discharge rate was modulated by adjusting the nitrogen pressure inside the reactor. Minimum pressure, as necessary, was used to maintain an adequate discharge rate.

The strands were then pelletized using a Conair/JETRO Pelletizer to obtain ⅛" long cylindrical pellets. The polymer had a melt index of 40.2 at 210° C., which corresponds to 19.6 at 200° C. DSC data obtained using a DuPont Model 990 afforded a melting point of 170° C., a recovery temperature of 183° C. and no melting component above 200° C.

GPC data was obtained giving a weight average molecular weight (Mw) of 140,049 and a number average molecular weight (Mn) of 25,709 to afford a polydispersity (Mw/Mn) of 5.45.

B. Melt Spinning of Polymer and Preparation of Wearable Articles

The polymer obtained in Step A was spun using a Wayne ¾ inch single screw melt extruder with zones 1, 2, and 3 set at 100° C., 180° C., and 190° C., respectively. A spinneret having a 4 hole spinneret, each having 0.026 inch diameter holes and set at 193° C., was used to extrude the polymer. The four filament yarn was passed through a finish guide with Lurol 6013 and then over Godet rolls with the first roll speed set at 720 rpm and the second roll speed set at 730 rpm. A windup speed of 750 rpm gave a yarn having 82.6 denier, a tenacity of 0.88 gpd at 528% elongation and a secant modulus of 0.099 gpd at 100% elongation.

The yarn was knitted into tubing and gave results similar to a Lycra® spandex control.

Example 12

This example includes a description of a semi-continuous process for the preparation of 0.10 molar % branched (1.02:2.00:0.98) PTMEG-MDI-HQEE thermoplastic polyurethane, employing DMDEE and TED as catalysts. No terminator was employed in this example.

A. Batch Prepolymer Formation

To a 10 gallon Stainless Steel jacketed stirred tank reactor was added poly(oxytetramethylene) glycol (1,7169.1 g, 8.54 moles) having a hydroxy number of 55.81 (2,010.57 Mol. Wt.). The reactor was heated by hot oil to above 100° C. to drive off moisture. Trimethylolethane (TME) (1.006 g, 0.008 mole), as branching agent, and Ciba Geigy Antioxidant 1010 (115.0 g), were both added to the reactor. When the temperature Of the ingredients in the reactor approached 100° C., the vacuum cycle was started. A nitrogen bleed was adjusted to prevent foaming and to stabilize the vacuum at about 2500 micron pressure or −25 inches of Hg. Moisture measurements made before and during the drying cycle indicated the moisture content had dropped to less than 200 PPM. After drying for 30 minutes, the vacuum was discontinued and the reactor was allowed to repressurize to 1 atmosphere under nitrogen.

4,4'-Diphenylmethane diisocyanate (MDI) (4,190.3 g, 16.74 moles) was then added to the reactor and the resulting mixture was mixed thoroughly to prevent linking of PTMEG chains The MDI was added in a 1.02:2.0 PTMEG/MDI ratio to cap the PTMEG. When the temperature of the reactor approached 200° C., dimorpholinodiethyl ether catalyst (DMDEE) (23.0 g) was injected into the stirring, heating reaction mixture. The reaction was continued as the temperature of the reactor approached 200° C. d spectrum analysis indicated that the capping reaction was completed after ten minutes of the high temperatures and exposure to catalyst.

The temperature in the reactor was permitted to cool. When the temperature in the interior of the reactor reached 115–120° C., the gear pump was initiated to recycle the prepolymer through heated traced Stainless Steel lines. The first 5 to 10 minutes of recycled material were considered waste and discarded.

B. Continuous Formation of Polymer for Melt Spinning

When formation of the prepolymer in Step a was complete, the chain extender 1,4-bis($\beta$-hydroxyethoxy) benzene (HQEE) was heated up in a grid melter to 140° C.

The hot, molten HQEE was recycled through the heat traced Stainless Steel lines with a "B" series Zenith gear pump. The first 5 to 10 minutes of the melted material running through the lines was waste and was not used in the reaction. The extruder, which was brought up to temperature during the drying of the PTMEG, was given at least one hour to reach operating conditions. The 26/1 Length/Diameter ratio extruder has three electrical heating/water cooling zones to control and maintain process. The extruder also has three melt thermocouple positions between and below the two side by side 28 mm screws. These melt thermocouples assist in identifying the temperature difference between process and melt thermocouples during the exothermic finishing/reaction phase of the polymer process. The residence time of the reaction ingredients in the extruder were determined by the feed rate and extuder screw RPM.

0.25 mole % solution of the triethylene diamine (TEDA) catalyst in tetrahydrofuran was metered into the extruder feed section along with the prepolymer and HQEE to give a 1.02:2:1 PTMEG-MDI-HQEE molar ratio and 0.03 molar % of the catalyst. The side by side, co-rotating screws were made up of various forward pumping, reverse pumping and kneading block elements which aid in conveying, providing residence time, and mixing, respectively. The reaction mixture was brought up in temperature and conveyed to the mixing section which completes the reaction by the time the finished polymer was extruded out of the strand die. The temperature at the entrance zone of the reactor was 150° C., the temperature of the remaining zones of the reactor was 200° C. and the temperature of the strand die was 190° C.

The strands were then pelletized using a Conair/JETRO Pelletizer to obtain ~1/8" long cylindrical pellets. The polymer had a melt index of 6.8 at 200° C. DSC data obtained using a DuPont Model 990 gave a melting point of 186.8° C., a recovery temperature of 200° C. and no melting component above 200° C.

GPC data was obtained giving a weight average molecular weight (Mw) of 152,328 and a number average molecular weight (Mn) of 31,016 to afford a polydispersity (Mw/Mn) of 4.91.

B. Melt Spinning of Polymer

The polymer was spun using a Wayne ¾ inch single screw melt extruder with zones 1, 2, 3, and 4 set at 170° C., 185° C., 198° C., and 200° C., respectively. A spinneret having a single hole spinneret, each having a 0.059 inch diameter hole and set at 202° C., was used to extrude the polymer. The monofilament yarn was passed through a finish guide with Lurol 6013 and then over Godet rolls with the first roll speed set at 675 rpm and the second roll speed set at 760 rpm. A windup speed of 1000 rpm gave a yarn having 64.3 denier, a tenacity of 1.16 gpd at 643% elongation and a secant modulus of 0.109 gpd at 100% elongation.

Example 13

This example includes a description of the preparation of 0.10 molar % branched (1.00:2.00:1.00) PTMEG-MDI-HQEE thermoplastic polyurethane by a one-shot reaction process of the prior art.

A. Preparation of Polymer

Into a 200 gram capacity 2CV Helicone reactor (Design Integrated Technologies), outfitted with a sight glass, sample addition ports and vacuum and nitrogen ports, and heated by hot oil using a 14 KW Sterlco hot oil heater, was added poly(oxytetramethylene) glycol (PTMEG) (114.149 g, 0.05602 moles) having a hydroxy number of 55.07 (2,037.59 Mol. Wt.). The ratio of the actual to the theoretical amount of PTMEG added was determined and then used to calculate the required weights for the remainder of reagents.

The oil bath was set to 165° C., a mild nitrogen flow was started and the mixer was operated in the down mode, medium speed.

Trimethylolethane (TME), (0.00675 g, 0.000056 moles), as branching agent, and Ciba Geigy Antioxidant 1010 (0.767 g), were combined and added to the reactor. The reaction mixture was mixed thoroughly to disperse and dissolve the TME and antioxidant in the polyol. When the reactor temperature reached 100° C., the vacuum drying cycle was started. A nitrogen bleed was adjusted to prevent foaming and to stabilize the vacuum at about 2000 micron pressure or −20 inches of Hg. The reactor reached 145° C. within about 20 minutes from the start of evacuation. After evacuating for 45 minutes, the oil bath temperature was reset to 225° C., the vacuum valve was closed and the reactor was allowed to repressurize to one atmosphere under nitrogen.

4,4'-Diphenylmethane diisocyanate (MDI) (28.061 g, 0.1121 moles) and 1,4-bis(β-hydroxyethoxy)benzene (HQEE) (11.234 g, 0.05602 moles) were combined in a separate container and mixed. When the reactor was repressurized and the temperature reached 180° C., the MDI/HQEE mixture was added to the reactor and rapidly mixed into the PTMEG polyol. After mixing for 5 minutes, DMDEE catalyst (0.153 g) was added to the reactor. After mixing for 15 minutes, the reactor was slowly evacuated with continued stirring and while allowing a very slight bleed of nitrogen to pass into the system. After about 5 minutes evacuation, the reactor stirrer was stopped, the vacuum valve was closed and the reactor was allowed to repressurize under nitrogen. When atmospheric pressure was achieved, the reactor vent valve was opened while continuing the nitrogen bleed and the reactor discharge initiated.

The reactor was discharged by opening the slide valve and drawing strands of polymer through an ice water bath, and deposited into a bucket containing additional ice water. The discharge rate was modulated by adjusting the nitrogen pressure inside the reactor. Minimum necessary pressure was used to maintain an adequate discharge rate. The strands were then pelletized using a 2" Yellow Jacket Wayne Pelletizer to obtain ~1/8" long cylindrical pellets. The polymer had a melt index of 9.2 at 210° C. DSC data obtained using a DuPont Model 990 gave a melting point of 182.6° C., a recovery temperature of 196.07° C. and another significant peak at 236° C. The polymer prepared in this example could not be spun into a fiber using a melt-spinning procedure.

Various modifications of the invention, in addition to those described herein, will be apparent to those skilled in the art from the foregoing description. Such modifications are also intended to fall within the scope of the appended claims.

What is claimed:

1. A melt-spun fiber which is prepared from a melt-spinnable elastomeric polymer having the formula:

$$[Pr-Ar]_n \qquad (I)$$

wherein:

n is from about 30 to about 65;

Ar is a residue of an aromatic dihydroxy compound; and

Pr is a prepolymer which comprises:

from about 85 to about 95 mole % of a prepolymer component of formula T-G-T;

from about 3 to about 15 mole % of a prepolymer component of formula T-G-T-G-T; and from 0 to about 2 mole % of a prepolymer component of formula T-G-T-G-T-G-T, wherein:

G is a residue of a polyol; and

T is a residue of a diisocyanate compound;
wherein in the preparation of the melt-spinnable elastomeric polymer, which preparation comprises combining together said polyol, said diisocyanate compound and said aromatic dihydroxy compound, said polyol and said diisocyanate compound are combined together in a mole ratio of about 1:2 to provide said prepolymer which is chain-extended with an aromatic dihydroxy compound to provide the melt-spinnable elastomeric polymer with substantially no higher melting polymeric component.

2. A melt-spun fiber according to claim 1 wherein the melt-spinnable elastomeric polymer contains less than about 5% by weight of higher melting polymeric component.

3. A melt-spun fiber according to claim 2 wherein the melt-spinnable elastomeric polymer contains less than about 4% by weight of higher melting polymeric component.

4. A melt-spun fiber according to claim 3 wherein the melt-spinnable elastomeric polymer contains less than about 3% by weight of higher melting polymeric component.

5. A melt-spun fiber according to claim 4 wherein the melt-spinnable elastomeric polymer contains less than about 2% by weight of higher melting polymeric component.

6. A melt-spun fiber according to claim 5 wherein the melt-spinnable elastomeric polymer contains less than about 1% by weight of higher melting polymeric component.

7. A melt-spun fiber according to claim 1 wherein n is from about 33 to about 56.

8. A melt-spun fiber according to claim 7 wherein n is from about 37 to about 54.

9. A melt-spun fiber according to claim 8 wherein n is from about 40 to about 50.

10. A melt-spun fiber according to claim 1 wherein said aromatic dihydroxy compound is selected from the group consisting of 1,4-bis($\beta$-hydroxyethoxy)benzene, bis($\beta$-hydroxyethoxy)terephthalate and p-xylylenediol.

11. A melt-spun fiber according to claim 10 wherein said aromatic dihydroxy compound is 1,4-bis($\beta$-hydroxyethoxy)benzene.

12. A melt-spun fiber according to claim 1 wherein said prepolymer comprises:
from about 90 to about 94 mole % of a prepolymer component of formula T-G-T;
from about 3 to about 7 mole % of a prepolymer component of formula T-G-T-G-T; and
from 0 to about 1 mole % of a prepolymer component of formula T-G-T-G-T-G-T.

13. A melt-spun fiber according to claim 12 wherein said prepolymer comprises:
from about 92 to about 94 mole % of a prepolymer component of formula T-G-T;
from about 3 to about 5 mole % of a prepolymer component of formula T-G-T-G-T; and
from 0 to about 0.5 mole % of a prepolymer component of formula T-G-T-G-T-G-T.

14. A melt-spun fiber according to claim 1 wherein said diisocyanate compound is selected from the group consisting of aromatic diisocyanate compounds and aliphatic diisocyanate compounds.

15. A melt-spun fiber according to claim 14 wherein said diisocyanate compound comprises an aromatic diisocyanate compound.

16. A melt-spun fiber according to claim 15 wherein said aromatic diisocyanate compound is selected from the group consisting of diphenylmethane diisocyanate, xylene diisocyanate, toluene diisocyanate, phenylene diisocyanate, and naphthalene diisocyanate.

17. A melt-spun fiber according to claim 16 wherein said diisocyanate compound is diphenylmethane diisocyanate.

18. A melt-spun fiber according to claim 14 wherein said diisocyanate compound comprises an aliphatic diisocyanate compound.

19. A melt-spun fiber according to claim 18 wherein said aliphatic diisocyanate compound is selected from the group consisting of dicyclohexylmethane diisocyanate and hexamethylene diisocyanate.

20. A melt-spun fiber according to claim 1 wherein said polyol comprises a polymeric diol.

21. A melt-spun fiber according to claim 20 wherein said polymeric diol is selected from the group consisting of a polyether diol and a polyester diol.

22. A melt-spun fiber according to claim 21 wherein said polymeric diol is a polyether diol.

23. A melt-spun fiber according to claim 22 wherein said polyether diol is a polyalkylene ether diol.

24. A melt-spun fiber according to claim 23 wherein said polyalkylene ether diol is selected from the group consisting of polyethylene ether glycol, polypropylene ether glycol, polytetramethylene ether glycol and polyhexamethylene ether glycol and copolymers thereof.

25. A melt-spun fiber according to claim 24 wherein said polyalkylene ether diol is polytetrmethylene ether glycol.

26. A melt-spun fiber according to claim 21 wherein said polymeric diol is a polyester diol.

27. A melt-spun fiber according to claim 26 wherein said polyester diol is selected from the group consisting of polybutylene adipate glycol and polyethylene adipate glycol and copolymers thereof.

28. A fiber which is melt-spun from a melt-spinnable elastomeric polymer, wherein the melt-spinnable elastomeric polymer comprises a diisocyanate-capped polyol prepolymer which is chain-extended with an aromatic dihydroxy compound, wherein in the preparation of said melt-spinnable elastomeric polymer, which preparation comprises combining together said polyol, said diisocyanate compound and said aromatic dihydroxy compound, said polyol and said diisocyanate compound are combined together in a mole ratio of about 1:2 to provide said prepolymer which is chain-extended with an aromatic dihydroxy compound to provide the melt-spinnable elastomeric polymer with substantially no higher melting polymeric component.

29. A fiber according to claim 28 wherein said preparation of said melt-spinnable elastomeric polymer comprises:
(a) combining together said polyol and said diisocyanate compound to provide said prepolymer containing substantially no unreacted diisocyanate compound; and
(b) combining together said prepolymer and said aromatic dihydroxy compound to provide said melt-spinnable elastomeric compound.

30. A fiber according to claim 29 wherein said prepolymer contains less than about 4 mole % unreacted diisocyanate compound.

31. A fiber according to claim 30 wherein said prepolymer contains less than about 3 mole % unreacted diisocyanate compound.

32. A fiber according to claim 31 wherein said prepolymer contains less than about 2 mole % unreacted diisocyanate compound.

33. A fiber according to claim 32 wherein said prepolymer contains less than about 1 mole % unreacted diisocyanate compound.

34. A textile article comprising fibers according to claim 1.

35. A textile article according to claim 34 which is selected from the group consisting of hosiery, pantyhose, panties and sportswear.

36. A textile article according to claim 35 which comprises pantyhose.

* * * * *

UNITED STATES PATENT AND TRADEMARK OFFICE
CERTIFICATE OF CORRECTION

PATENT NO. : 6,277,942 B1
DATED : August 21, 2001
INVENTOR(S) : Robert P. Foss

It is certified that error appears in the above-identified patent and that said Letters Patent is hereby corrected as shown below:

Column 2,
Line 20, delete "vam" and insert -- yarn -- therefor;

Column 10,
Line 50, delete "diisocvanate-capped" and insert -- diisocyanate-capped -- therefor;

Column 15,
Line 6, delete "filly" and insert -- fully -- therefor;
Line 29, delete "1.2" and insert -- 1:2 -- therefor;
Line 35, delete "1.2" and insert -- 1:2 -- therefor;
Line 39, delete "1.2" and insert -- 1:2 -- therefor;

Column 19,
Line 25, delete "1.2" and insert -- 1:2 -- therefor;

Column 22,
Line 66, delete "preferrea" and insert -- preferred -- therefor;

Column 25,
Line 13, delete "lycol" and insert -- glycol -- therefor;

Column 31,
Line 2, after "for" insert -- 30 --;

Column 33,
Line 45, delete "arid" and insert -- and -- therefor;

Column 39,
Line 27, delete "iphenylmethane" and insert -- diphenylmethane -- therefor;

UNITED STATES PATENT AND TRADEMARK OFFICE
CERTIFICATE OF CORRECTION

PATENT NO. : 6,277,942 B1
DATED : August 21, 2001
INVENTOR(S) : Robert P. Foss

It is certified that error appears in the above-identified patent and that said Letters Patent is hereby corrected as shown below:

Column 40,
Line 53, after "200°C." delete "d" and insert -- infrared -- therefor.

Signed and Sealed this

Thirtieth Day of April, 2002

Attest:

Attesting Officer

JAMES E. ROGAN
Director of the United States Patent and Trademark Office